US005455534A

United States Patent [19]

Motegi et al.

[11] Patent Number: 5,455,534

[45] Date of Patent: Oct. 3, 1995

[54] SEMICONDUCTOR DEVICE FOR LIQUID CRYSTAL PANEL DRIVING POWER SUPPLY

[75] Inventors: Hiroyuki Motegi; Takeshi Nakashiro, both of Yokohama, Japan

[73] Assignee: Kabushiki Kaisha Toshiba, Kawasaki, Japan

[21] Appl. No.: 17,381

[22] Filed: Feb. 12, 1993

[30] Foreign Application Priority Data

Feb. 14, 1992 [JP] Japan .................................... 4-028475

[51] Int. Cl.[6] ................................ G05F 1/10; G06F 3/14

[52] U.S. Cl. ............................ 327/544; 327/546; 345/98

[58] Field of Search ................................ 307/451, 296.3, 307/493, 270, 296.6, 296.8, 572, 576, 579, 585, 475; 345/98; 326/82, 83, 66; 327/535, 544, 108, 112, 545, 546, 427, 434

[56] References Cited

U.S. PATENT DOCUMENTS

| | | | |
|---|---|---|---|
| 3,775,693 | 11/1973 | Proebsting | 330/270 |
| 4,099,073 | 7/1978 | Hashimoto et al. | 327/434 |
| 4,158,786 | 7/1979 | Hirasawa | 327/543 |
| 4,621,207 | 11/1986 | Suganuma et al. | 327/544 |
| 5,283,565 | 2/1994 | Suzuki et al. | 327/108 |
| 5,287,019 | 2/1994 | Nonaka et al. | 326/66 |

*Primary Examiner*—Timothy P. Callahan
*Assistant Examiner*—Dinh T. Le
*Attorney, Agent, or Firm*—Oblon, Spivak, McClelland, Maier & Neustadt

[57] ABSTRACT

A semiconductor device for a liquid crystal panel driving power supply in which a first reference voltage is converted in impedance by an operational amplifier to output it as a second reference voltage, comprising control means wherein, in a suitable fixed period during a period of displaying a liquid crystal, the current supply capacity of said operational amplifier is enhanced, and, in another period during said period of displaying a liquid crystal, the current supply capacity of said operational amplifier is lowered.

29 Claims, 20 Drawing Sheets

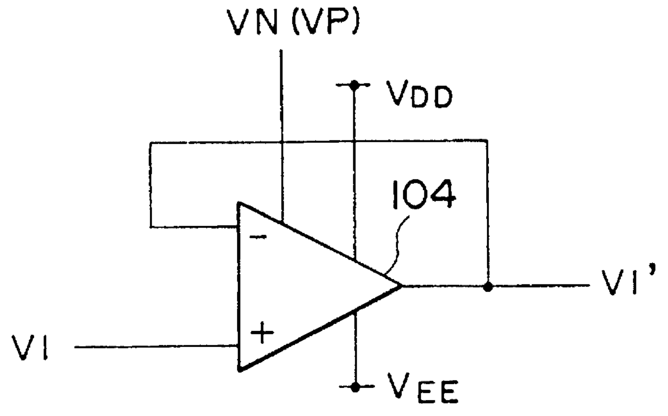
FIG. 19
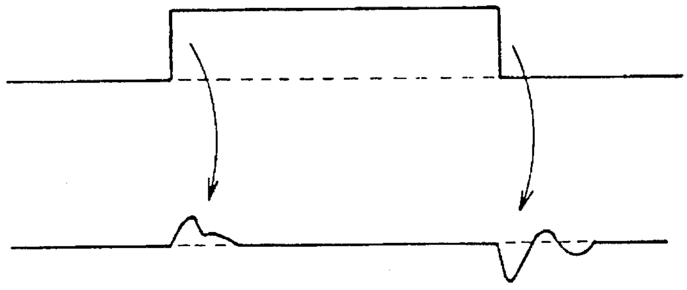
FIG. 20(A)
FIG. 20(B)

SEMICONDUCTOR DEVICE FOR LIQUID CRYSTAL PANEL DRIVING POWER SUPPLY

FIELD OF THE INVENTION

The present invention relates to a power supply device for driving a liquid crystal suitable for use with realization of a low power consumption in driving a liquid crystal panel with a high drive current supplying capacity from a circuit constructed on a semiconductor integrated circuit.

BACKGROUND OF THE INVENTION

FIG. 23 shows a conventional liquid crystal driving power supply device. As shown in FIG. 23, this power supply device has a drive circuit 100 and a plurality of output portions 102 provided in correspondence to loads in order to supply an electric potential to a segment/common capacitative load CS of a liquid crystal panel. The drive circuit 100 has a divider circuit 105 and an operational amplifier circuit 109. The operational amplifier circuit 109 has a plurality of operational amplifiers 104. The divider circuit 105 has resistors R1 to R6 which divide a voltage between a high potential for liquid crystal VDD and a low potential for liquid crystal VEE to generate potentials V1 to V5. The potentials V1 to V5 are supplied to the plurality of operational amplifiers 104 in the operational amplifier circuit 109. The operational amplifiers 104 feed the inputted potentials V1 to V5 as potentials V1' to V5' which are the same potential as the former to a power supply wiring 103. The power supply wiring 103 supplies the high potential for liquid crystal VDD and the potentials V1' to V5'. Capacitors C1 to C5 are connected to the wiring 103 on which the potentials V1' to V5' appear. The output portion 102 is connected to the power supply wiring 103. On the basis of select signals S0 to S5, either the high potential for liquid crystal VDD or the potentials V1' to V5' selected by transfer gates 108 are supplied as a high potential for liquid crystal VDD" or output voltages V1", V2", V3", V4" and V5" to the segment/common capacitative load CS through an external connection terminal 101. The operational amplifiers 104 are supplied with either voltage VN or VP from a reference power supply circuit 106 for operational amplifiers 10.

FIG. 24 is a circuit diagram showing an example of the specific construction of the reference power supply circuit for operational amplifiers 106 shown in FIG. 23. As shown in FIG. 24, a P-type MOS transistor 1, a resistor RA and an N-type MOS transistor 2 are connected in series between the high potential for liquid crystal VDD and the low potential for liquid crystal VEE. In the P-type MOS transistor 1 and the N-type MOS transistor 2, drain and gate are connected. Voltage VP and voltage VN are derived from opposite ends of the resistor RA.

FIG. 25 is a circuit diagram showing an example of the specific construction of the operational amplifier 104 shown in FIG. 23, particularly illustrating a P top-type circuit. As shown in FIG. 25, voltage VP is supplied to the gate of a P-type MOS transistor 30 and the gate of a P-type MOS transistor 35. Voltage V5 is supplied to the gate of a P-type MOS transistor 31. The sources of P-type MOS transistors 30 and 35 are connected to the high potential for liquid crystal VDD. The drain of the P-type MOS transistor 30 is connected to the sources of P-type MOS transistors 31 and 32. The sources of N-type MOS transistors 33, 34 and 36 are connected to the low potential for liquid crystal VEE. The gates of the N-type MOS transistors 33 and 34 are connected in common and connected to a connecting node between the drain of the P-type MOS transistor 32 and the drain of the N-type MOS transistor 34. The P-type MOS transistor 31 and the N-type MOS transistor 33 have their drains connected to each other, a connecting node of which is connected to the gate of the N-type MOS transistor 36. The drain of the P-type MOS transistor 35 and the drain of the N-type MOS transistor 36 are connected to each other, from the connecting node of which output voltage V5' is outputted. The output voltage V5' is fed back to the gate of the P-type MOS transistor 32. A capacitor for phase security CP for preventing oscillation of the operational amplifier is connected between the gate of the P-type MOS transistor 32 and the gate of the N-type MOS transistor 36. It is to be noted that the capacitor CP may be omitted.

FIG. 26 is a circuit diagram showing a further example of the operational amplifier 104 shown in FIG. 23, particularly illustrating an N-top type circuit. As shown in FIG. 26, voltage VN is supplied to the gate of an N-type MOS transistor 70 and the gate of an N-type MOS transistor 75. Voltage V1 is supplied to the gate of an N-type MOS transistor 71. The sources of the N-type MOS transistors 70 and 75 are connected to a low potential for liquid crystal VEE. The drain of the N-type MOS transistor 70 is connected to the sources of the N-type MOS transistors 71 and 72. The sources of P-type MOS transistors 73, 74 and 76 are connected to a high potential for liquid crystal VDD. The gates of the P-type MOS transistors 73 and 74 are connected in common and connected to a connecting node between the drain of the N-type MOS transistor 72 and the drain of the P-type MOS transistor 74. The drain of the N-type MOS transistor 71 and the drain of the P-type MOS transistor 73 are connected, a connecting node of which is connected to the gate of the P-type MOS transistor 76. The drain of the N-type MOS transistor 75 and the drain of the P-type transistor 76 are connected, from a connecting node of which output voltage V1' is outputted. This output voltage V1' is fed back to the gate of the N-type MOS transistor 72. A capacitor CN for phase security for preventing oscillation of the operational amplifier is connected between the gate of the N-type MOS transistor 72 and the gate of the P-type MOS transistor 76.

The use of the FIG. 25 circuit or the FIG. 26 circuit as the operational amplifier 104 depends on the potentials V1, V2, V3, V4 and V5 to be inputted and the characteristic of the amplifier. The operational amplifier circuit 109 includes those shown in FIG. 25 and FIG. 26 as the operational amplifier 104.

With the construction as described above, in the divider circuit 105 in the drive circuit 100, the resistors of resistors R1 to R6 are provided in series between the high potential for liquid crystal VDD and the low potential for liquid crystal VEE, and the portion between the high potential for liquid crystal VDD and the low potential for liquid crystal VEE is resistor-divided to thereby obtain the potentials V1 to V5. These voltages V1 to V5 are inputted into the respective operational amplifiers 104. Each of the operational amplifiers 104 has a configuration which is generally known as the voltage-follower type wherein their output is fed back to one terminal as shown in FIGS. 25 and 26. That is, the inputted potentials V1 to V5 are impedance-converted into the form of the potentials V1' to V5' which are exactly the same potential as the former and supplied to the power supply wiring 103. The potentials V1 to V5 and the potentials V1' to V5' are the same in the voltage as each other but different in the current supply capacity from each other. That is, the current supply capacity of the potentials V1 to V5 is determined by the resistance value of the resistors R1 to R6 constituting the divider circuit 105. On the other hand, in the latter, the current supply capacity of the potentials V1' to V5' is determined by the current supply capacity of the operational amplifier 104, and therefore, much more output currents are obtained. As the result, the power supply wiring 103 which receives output currents of the operational amplifiers 104 and the output portion 102 increase in the load drive capacity with respect to the external segment/common capacitative load CS. The high potential for liquid crystal VDD and the potentials V1' to V5' are selected on the basis of the select signals S0 to S5 in the output portion 102 and supplied to the segment/common capacitative load CS through the external connection terminal 101. Thereby, the load CS is charged and discharged to assume a predetermined voltage.

FIG. 27 is a timing chart for a description of the operation of the FIG. 23 power supply device. In FIG. 27, (A), (B), (C), (D) and (E) show a select signal S1, a select signal S4, a select signal S5, an operational amplifier current IOP which flows through the operational amplifier 104, and a voltage applied to the segment/common capacitative load CS from the external connection terminal 101 of the output portion 102, respectively.

Also as shown in FIG. 27, in the case where the select signals S1, S4 and S5 are sequentially inputted, the potentials V1", V4", V5" and V1" are successively outputted in correspondence to the select signals S1, S4 and S5 to the external connection terminal 101 in FIG. 23. At this time, the segment/common capacitative load CS connected to the external connection terminal 101 is charged and discharged to the aforementioned potentials. In this case, the operational amplifier current IOP of constant magnitude flows in the operational amplifiers 104 in FIG. 23. As the result, the segment/common capacitative load CS as the load is driven.

Since the conventional liquid crystal driving power supply device is configured as described above, there arises a difficulty in that the power consumption is large as will be described below. For example, as will be understood from FIG. 27, it is assumed that the voltage V1" is outputted from the external connection terminal 101 to the segment/common capacitative load CS through the transfer gate 108(1) in accordance with the select signal S1 on the basis of the output V1' from the operational amplifier 104(1). It is further assumed that the output V4" on the basis of the output V4' from the other operational amplifier 104(4) is outputted after time Tf in accordance with the select signal S4. It is assumed, substantially similar to the former, that the output V5" is changed to the output V1" after time Tr. During these times Tf and Tr, it is necessary for the operational amplifier current IOP to keep flowing in order to drive the load, but conversely, during time Ts at which the voltage such as the voltage potential V4' does not change but the output of the same voltage value keeps outputting, the operational amplifier current IOP keeps flowing. The current which flows during an unnecessary time, as just mentioned above, is so large that it cannot be disregarded, resulting in an increase of power consumption. On the other hand, in the case of a large liquid crystal panel or the like, the number of the segment/common capacitative load CS and the capacity increase. Because of this, the time Tf and the time Tr become longer, and it is necessary to shorten the times Tf and Tr. To this end, the operational amplifier current IOP, which is a current steadily flowing into the operational amplifier 104, is unavoidably made large, and in addition, the power consumption increases as a consequence.

Alternatively, there is contemplated a method in which the potentials V1 to V5 as outputs of the divider circuit 105 are directly coupled to the potentials V1' to V5' and the operational amplifier 104 which requires the operational amplifier current IOP is removed to reduce the current. That is, the resistance values of the resistors R1 to R6 are made small to thereby lower the output impedances of the potentials V1 to V5, and the output current supplied to the segment/common capacitative load CS can be made large. However, in the case of the semiconductor integrated circuit, if the resistors R1 to R6 are made too small, the unevenness in terms of the manufacture increases; and in addition, in the case where the resistors R1 to R6 are made of thin P-type or N-type diffusion resistant layers or the like, a modulation effect of the substrate caused by a semiconductor substrate arises. For this reason, for example, there is a problem in that, even if the resistor R1 were to have the value as expected, the resistor R6 would have an abnormally large value. That is, it is difficult to properly perform the management of resistance values to properly maintain the accuracy of the potentials V1 to V5. To overcome this difficulty, the resistance values of the resistors R1 to R6 may be made large, and the unevenness arising during the manufacture may be suppressed. However, if such measures are taken, the drive capacity unavoidably becomes small. Therefore, uses of devices which may employ large resistance values other than those for driving a liquid crystal panel for displaying a small watch which does not require much current and potential accuracy of V1 to V5 cannot be said to be a realistic selection. Therefore, it is essential for a large liquid crystal panel which has a large load capacity and requires a large drive capacity to have the operational amplifier 104 for impedance conversion.

In liquid crystal panels or the like, the segment/common which are two electrodes for determining the transmission (lighting) of light and non-transmission (unlighting) of light with respect to the liquid crystal is a capacity component as viewed from the semiconductor circuit for driving the load. The liquid crystal panels become larger and larger, and the liquid crystal voltage used therefor, the segment/common of the liquid crystal panel and so forth increase with the trend of larger panels. The consumption current required to display the liquid crystal panel depends upon f·C·V (frequency× Capacity×Voltage). Therefore, as the voltage and capacity that should be used with a trend toward larger liquid crystal panels become large, an increase of consumption current is brought forth.

Recently, personal computers, word processors and the like which have large liquid crystal panels are miniaturized and formed into a book-type. Thereby, they are convenient for being carried but have a problem in that the life of their power cells is short. That is, there is a great demand with respect to the reduction in the consumption of power of the liquid crystal panels.

SUMMARY OF THE INVENTION

An object of the present invention is to solve the above-described problems encountered in the prior art and provide a liquid crystal driving power supply device in which, even if a liquid crystal panel becomes larger and the drive voltage becomes higher, the power consumption by the liquid crystal panel can be reduced.

A first reference voltage is impedance-converted by an operational amplifier and outputted as a second reference voltage and applied to a liquid crystal panel. The potential supply capacity of the operational amplifier is in a high state during a fixed period in the period of displaying a liquid crystal. During the other period in the period of displaying a liquid crystal, the current supply capacity of the operational amplifier is in a low state. Thereby, the current consumption is reduced.

As described above, according to the present invention, in changing the voltage supplied to the liquid crystal panel, at the time the voltage is changed, the current drive capacity is increased to thereby realize the supply of voltage with high accuracy and quick response, and after the determination of voltage, the current drive capacity is restricted to thereby reduce the current consumption.

BRIEF DESCRIPTION OF THE DRAWINGS

FIG. 19 is a diagram for a description of an operational amplifier the current supply capacity of which has been changed;

FIG. 20 is a waveform diagram for a description of the operation of the operational amplifier shown in FIG. 19;

DESCRIPTION OF THE PREFERRED EMBODIMENTS

Embodiments of the present invention will be described hereinafter with reference to the accompanying drawings.

Figure 1:
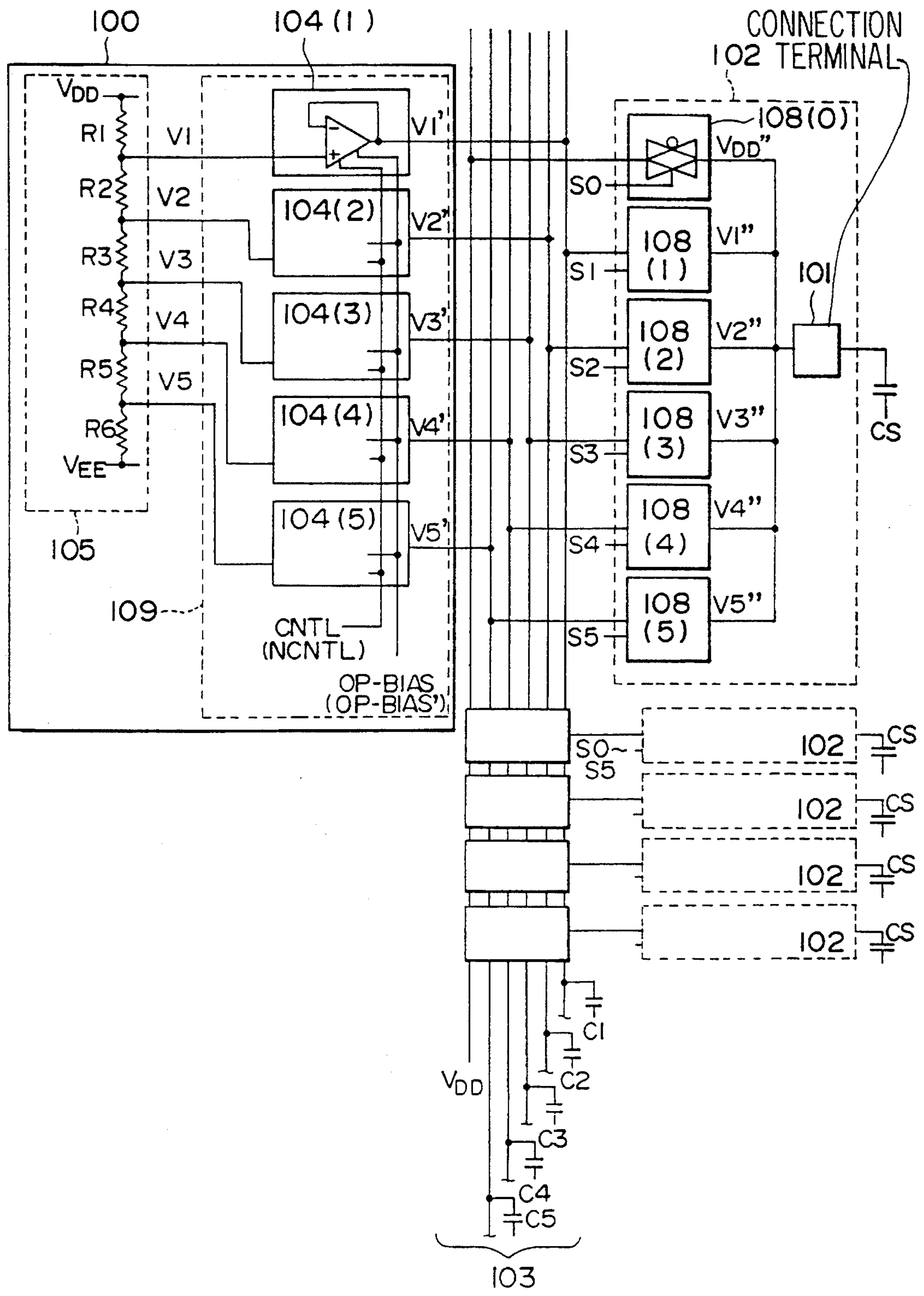
FIG. 1 is a diagram showing the constitution of a circuit for a liquid crystal driving power supply device according to an embodiment of the present invention.

FIG. 1 shows a circuit for a liquid crystal driving power supply device according to a first embodiment of the present invention. As shown in FIG. 1, an operational amplifier bias OP-Bias (or bias OP-Bias') and a control signal CNTL are supplied to a plurality of operational amplifiers 104 in an operational amplifier circuit 109. The drive capacity is switched by the control signal CNTL. The operational amplifier bias OP-Bias and OP-Bias' have a suitable constant potential between a high potential for liquid crystal VDD and a low potential for liquid crystal VEE, and they are not necessarily equal to each other.

In FIG. 1, the divider circuit 105 is a circuit for producing electric potentials V1 to V5 to be a reference outputted to a segment/common capacitative load CS or the like. In this circuit 105, a portion between the high potential for liquid crystal VDD and the low potential for liquid crystal VEE being used in a liquid crystal panel is divided by resistors R1 to R6 to produce the potentials V1 to V5. In order to improve the accuracy of these potentials V1 to V5, these resistors R1 to R6 are designed so as to have high resistance values as P-type diffusion resistors by a polysilicon in a semiconductor or P-type of weak concentration. Since the resistance value of the resistors R1 to R6 is made high, a current flowing between the high potential for liquid crystal VDD and the low potential for liquid crystal VEE can be suppressed, and the accuracy of the take-out end of the potentials V1 to V5 can be enhanced. In addition, the unevenness in the manufacture of semiconductors can be suppressed. At the same time the resistance values change due to modulation from a substrate during the manufacturing of the semiconductor substrates. The unevenness of the resistance value of the resistors can be suppressed by adjusting the length thereof.

The potentials V1 to V5 produced by the divider circuit 105 are applied as input voltages to the operational amplifiers 104 which are called the voltage-follow type. Thereby, the potentials V1 to V5 are impedance-converted without changing the voltage and removed as potentials V1' to V5'. That is, the potentials V1 to V5 have output impedances corresponding to the resistors R1 to R6 whereas the output potentials V1' to V5' from the operational amplifiers 104 have low impedance and have a large drive capacity. This drive current is supplied from a power supply within a semiconductor integrated circuit formed with the operational amplifiers 104 to a power supply wiring 103. An output portion 102 has transfer gates 108 controlled by select signals S0 to S5. Each of the transfer gates 108 outputs a voltage corresponding to its own out of the high potential for liquid crystal VDD and the potentials V1' to V5' in the power supply wiring 103. One of the outputs V1" to V5" of the transfer gates 108 is supplied to a segment/common capacitative load CS of a liquid crystal panel through an external connection terminal 101.

The output portion 102 is so designed that the high potential for liquid crystal VDD and one out of the potentials V1' to V5' are selected by the select signals S0 to S5. In the case where the output portion 102 is a segment output portion, as the select signals S0 to S5, those in which display data signal of the liquid crystal panel is bound can be also used. In the case of the segment output portion, transfer gates 108(1) and 108(4) in the output portion 102 may be removed. In the case of a common exclusive-use output portion, transfer gates 108(2) and 108(3) may be removed.

Figure 2:
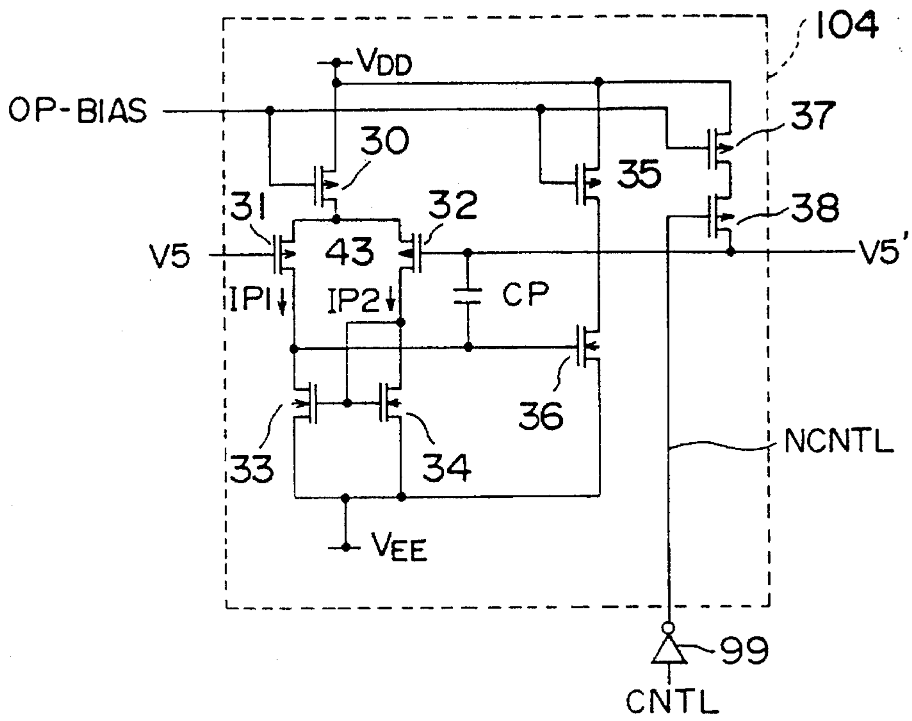
FIG. 2 is a diagram showing the constitution of a circuit showing an operational amplifier shown in FIG. 1.

FIG. 2 is a circuit representation showing one example of the operational amplifier 104 shown in FIG. 1. FIG. 2 is different from FIG. 25 in that transistors 37 and 38 are provided. P-type MOS transistors 37 and 38 are connected in series between the high potential for liquid crystal VDD and the output terminal of the output voltage V5', an operational amplifier bias OP-Bias is connected to the gate of the P-type MOS transistor, and a control signal CNTL is connected to the gate of the P-type MOS transistor 38.

In the circuit arrangement shown in FIG. 2, the P-type MOS transistors 31 and 32 are comparatively operated by currents IP1 and IP2 branched from a connecting node 43 on the drain side of the P-type MOS transistor 30. Thereby, the output voltage V5' is controlled so that the voltage value thereof is equal to the potential V5. The current drive capacity of the Output terminal outputting the voltage V5' is changed by applying the inverted signal of CNTL onto the control gate of the P-type MOS transistor 38.

Figure 3:
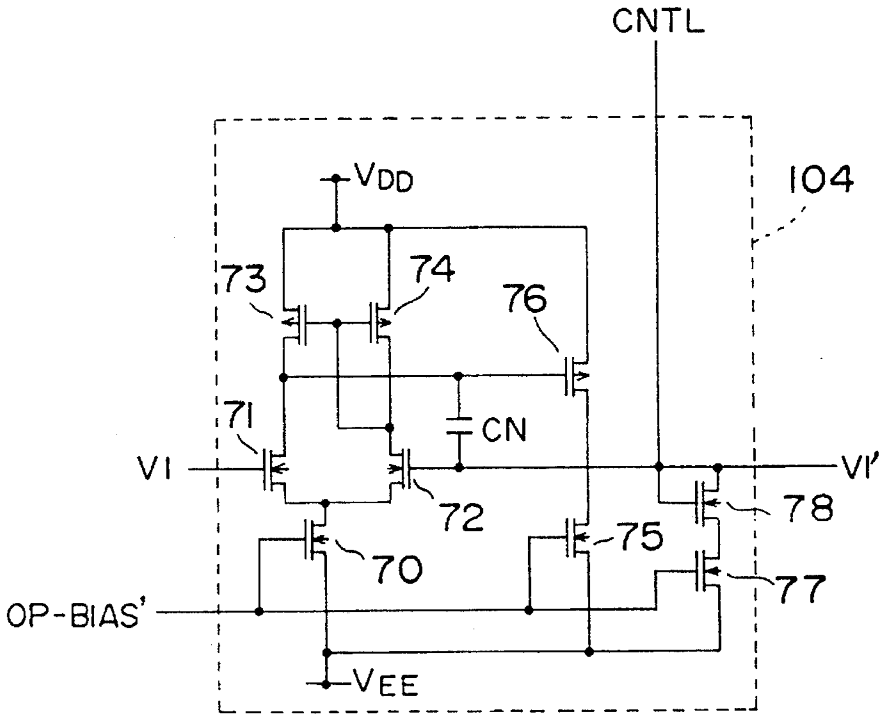
FIG. 3 is a diagram showing the constitution of a circuit showing a further example of an operational amplifier shown in FIG. 1.

FIG. 3 shows a further example of the operational amplifier 104 in FIG. 1. FIG. 3 is different from FIG. 26 in that transistors 77 and 78 are provided. That is: the N-type MOS transistors 77 and 78 are connected in series between the low potential for liquid crystal VEE and the output terminal of the output voltage V1'; the operational amplifier bias OP-Bias' is applied to the gate of the N-type MOS transistor 77; and the control signal CNTL is applied to the gate of the N-type MOS transistor 78.

In the circuit of FIG. 3, the N-type MOS transistors 71 and 72 are comparatively operated by currents from the N-type MOS transistors 71 and 72 which flow into the drain of the N-type MOS transistor 70. Thereby, the out-put voltage V1' is controlled so that the voltage value thereof is equal to the potential V1. The N-type MOS transistors 77 and 78 cause the control signal CNTL to change the current drive capacity of the output voltage V1'.

As described above, FIG. 2 shows the circuit organization of the P top type, and FIG. 3 shows that of N top type. The selective use of these two arrangements depends on the sensitivity of the operational amplifier 104. For one close to the low potential for liquid crystal VEE in which input voltage is low, the arrangement of P top type is applied, and for one close to the high potential for liquid crystal VDD, the arrangement of N top type is applied. In the case of FIG. 1, for the operational amplifier whose inputs are potentials V4 and V5, the P top type is used, and for the operational amplifier whose inputs are potentials V1, V2 and V3, the N top type is used. The P top type and the N top type are mixed for use.

As the potentials V1 to V5 are inputted, these operational amplifiers 104 determine the amplification and the current supply capacity. That is, these operational amplifiers 104 input the operational amplifier bias OP-Bias or OP-Bias' as a suitable constant potential between the high potential for liquid crystal VDD and the low potential for liquid crystal VEE. The inputted potentials V1 to V5 are compared with the potentials V1' to V5' which are output potentials of the amplifiers 104 themselves. The compared result is inputted into the gate of the P-type MOS transistor 36 or 76 to perform an equilibrium operation so as to obtain the potentials V1' to V5' of voltages equal to the potentials V1 to V5. In this state, the current is always caused to continuously flow from the high potential for liquid crystal VDD to the low potential for liquid crystal VEE.

The operational amplifier bias OP-Bias and OP-Bias' applied to the operational amplifiers 104 are suitable voltages between the high potential for liquid crystal VDD and the low potential for liquid crystal VEE, as previously mentioned. In the operational amplifiers 104 shown in FIG. 2, it is assumed that the voltage of the operational amplifier bias OP-Bias is VOP. As the VOP, the voltage which is close to the high potential for liquid crystal VDD and capable of satisfying VDD–VOP> VTHP (wherein VTHP represents the threshold voltage of the P-type MOS transistor) is normally inputted. Thereby, a light gate bias in the form of VGS=VDD–VOP is applied to the gates of the P-type transistors 35 and 37. Therefore, a normal output current is obtained in a saturation region of the MOS transistor. Because of this, the output current capacity of the operational amplifier 104 is decided by the P-type MOS transistors 35 and 37. Similarly to the former, in the operational amplifier 104 shown in FIG. 3, the operational amplifier bias OP-Bias' is to be a light potential close to the low potential for liquid crystal VEE, and the output current capacity is decided by the N-type MOS transistors 75 and 77.

Now, the potential of the segment/common connected to the external connection terminal 101 is changed while suppressing the power consumption in the following manner. That is, the sufficient drive capacity is given to the P-type MOS transistors 35 and 37 in FIG. 2 and the N-type MOS transistors 75 and 77 in FIG. 3. After a predetermined output potential has been outputted to the external connection terminal 101, the P-type MOS transistor 38 in FIG. 2 and the N-type MOS transistor 78 in FIG. 3 are turned off by the control signal CNTL. Thereby, the drive capacity of the operational amplifier 104 is limited. Thereby, the power consumption is reduced.

Figure 4:
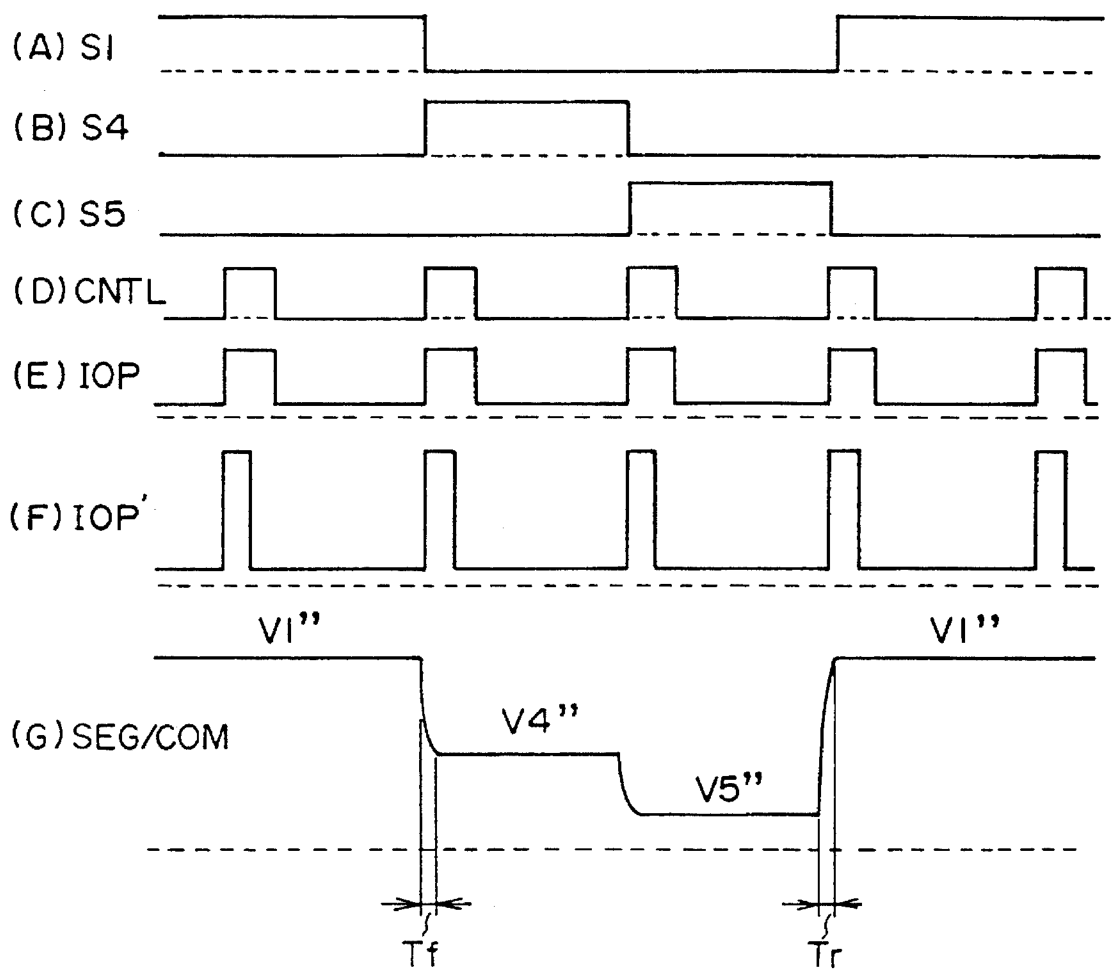
FIG. 4 is a timing chart for explaining the operation of the construction shown in FIG. 1.

FIG. 4 is a timing chart indicating the aforementioned operation. In FIG. 4: (A) indicates a select signal S; (B) indicates a select signal S4; (C) indicates a select signal S5; (D) indicates a control signal CNTL applied to the operational amplifier 104; (E) indicates a current IOP as one example of current which flows into the operational amplifier 104; (F) indicates a current IOP' as the other example of current which flows into the operational amplifier 104; and (G) indicates a voltage SEG/COM applied from the external connection terminal 101 of the output portion 102 to the segment/common capacitative load CS.

As will be apparent from FIG. 4, in the operational amplifier 104, the operational amplification portion current IOP is changed pulsewise by the control signal CNTL. Thereby, a pulse-like current is supplied to the segment/common capacitative load CS. That is, the current drive capacity at the time when the voltage of the segment/common capacitative load CS can be sufficiently secured, and after the voltage is determined, the operational amplification portion current IOP decreases. Thereby, the mean value of the current considerably decreases. On the other hand, it is assumed that the drive capacity of the operational amplifier 104 at the time when the output voltage of the segment/common capacitative load CS is switched is further made large and changed as shown in FIG. 4(F). In this case, the current is the operational amplification portion current IOP', and time Tf and time Tr required for changing the voltage of the segment/common capacitative load CS become short. Thereby, a short determination time for a predetermined voltage will suffice. Thereby, the high speed operation can be carried out while suppressing the current consumption.

Figure 5:
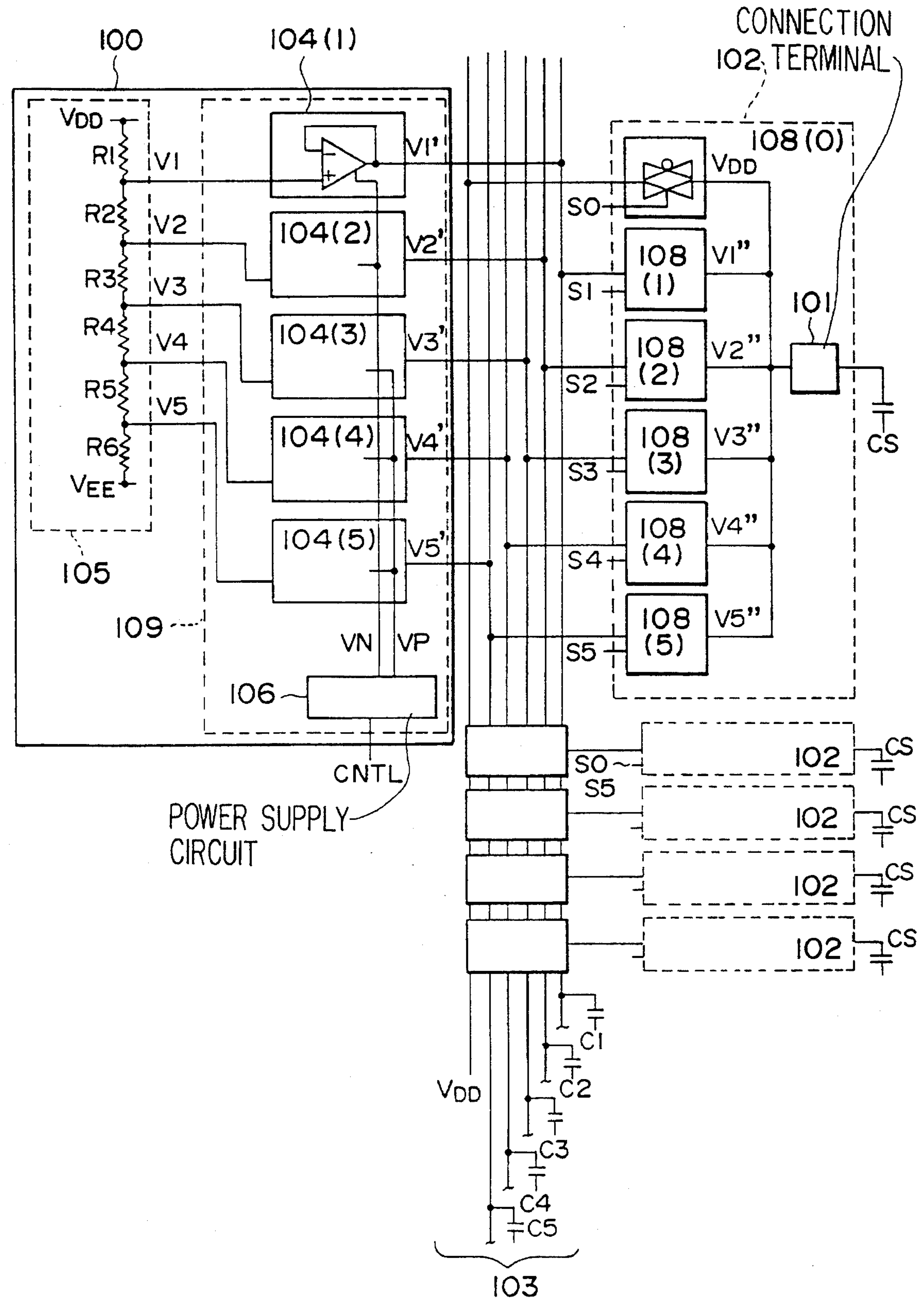
FIG. 5 is a diagram showing the constitution of a circuit for a liquid crystal driving power supply device according to a further embodiment of the present invention.

FIG. 5 is a circuit representation of a liquid crystal driving power supply device according to a second embodiment of the present invention. In FIG. 5, a reference power supply circuit 106 for an operational amplifier supplies voltage VP or VN to the operational amplifiers 104 which constitute an operational amplifier circuit 109. The voltages VP and VN are designed so that voltage values thereof can be changed by the control signal CNTL. Other features of the arrangement are the same as those shown in FIG. 1. The same circuit elements as those of FIG. 1 are designated by the same reference numerals.

Figure 6:
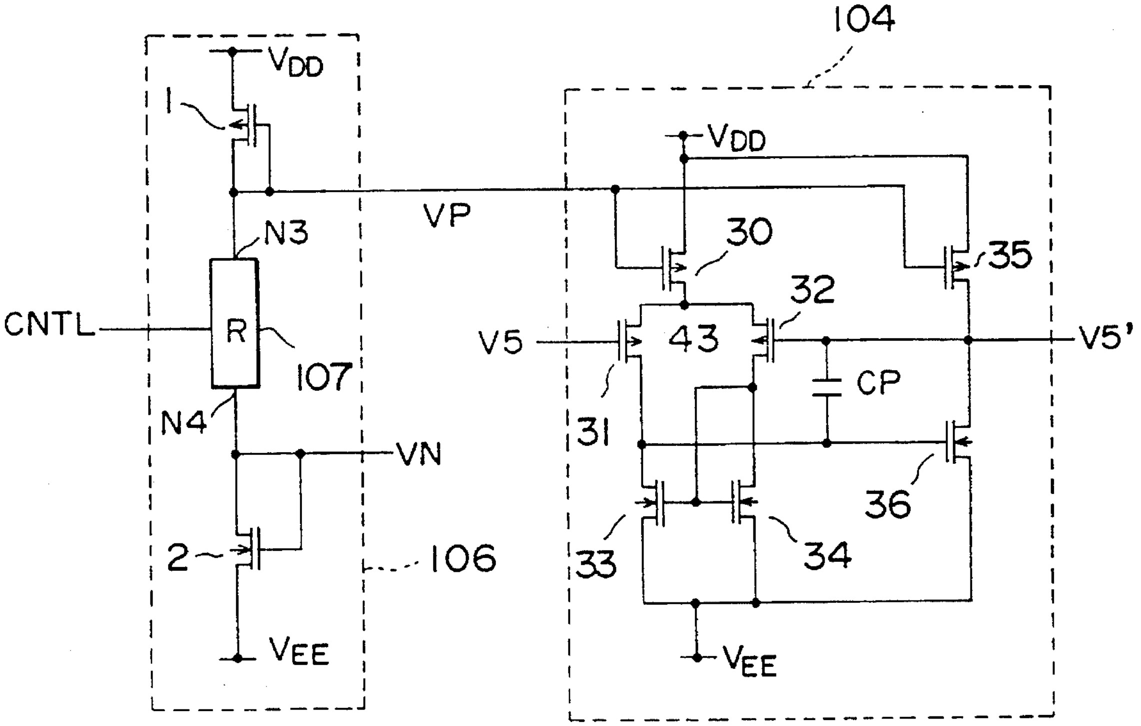
FIG. 6 is a diagram showing the constitution of a circuit constituting a first example of a reference power supply circuit for an operational amplifier according to the organization shown in FIG. 5.
Figure 25:
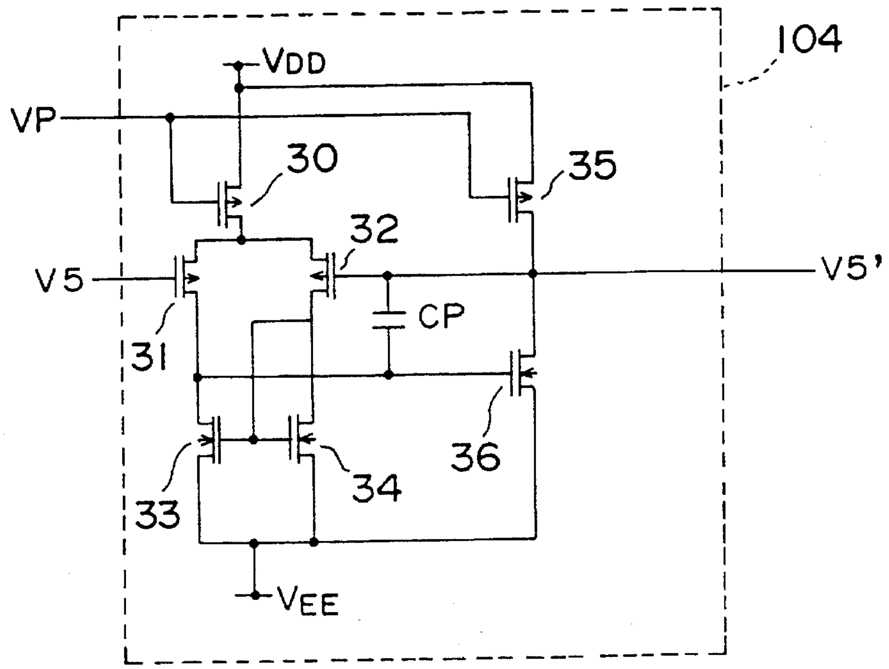
FIG. 25 PRIOR ART
FIG. 25 is a circuit diagram of a circuit constituting an example of the operational amplifier shown in FIG. 23.

FIG. 6 shows a first example of the reference power supply circuit 106 for the operational amplifier used in FIG. 5. In FIG. 6, in a resistance variable circuit 107, the resistance value between connecting nodes N3 and N4 is changed on the basis of the control signal CNTL. The output voltage VP of the reference power supply circuit 106 for an operational amplifier is applied to the operational amplifier 104. In such a case, the circuit arrangement of P top type shown in FIG. 25 is applied.

In FIG. 6, in the case where the control signal CNTL is at a H level, in the resistance variable circuit 107, the resistance value between connecting nodes N3 and N4 is made small. Thereby, a current flowing through the circuit 107 is increased. On the other hand, in the case where the control signal CNTL is at a L level, in the resistance variable circuit 107, the resistance value between the connecting nodes N3 and N4 is large. Thereby, the current flowing through the circuit 107 is reduced. The voltage VP and the voltage VN are supplied in place of the operational amplifier bias OP-Bias and OP-Bias' to the succeeding operational amplifier 104.

The voltages VP and VN applied to the operational amplifier 104 are controlled by the control signal CNTL whereby the current supply capacity of the operational amplifier 104 can be switched. Thereby, if the level of the control signal CNTL is suitably switched as shown in the timing chart of FIG. 4, the mean value of the current of the operational amplifier 104 can be considerably reduced.

Figure 26:
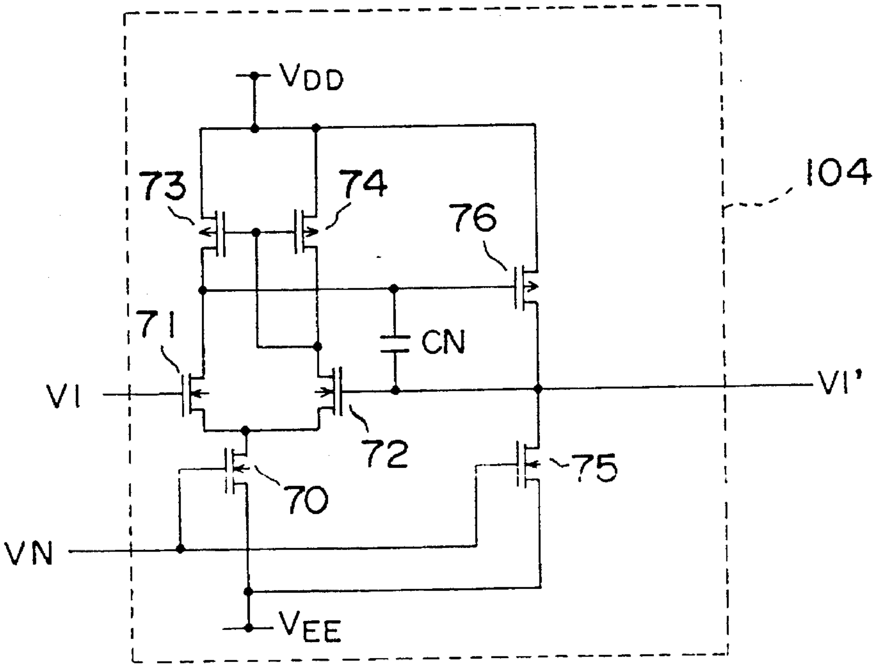
FIG. 26 PRIOR ART
FIG. 26 is a circuit diagram of a circuit constituting another example of the operational amplifier shown in FIG. 23.
Figures 27A, 27B, 27C, 27D, 27E:
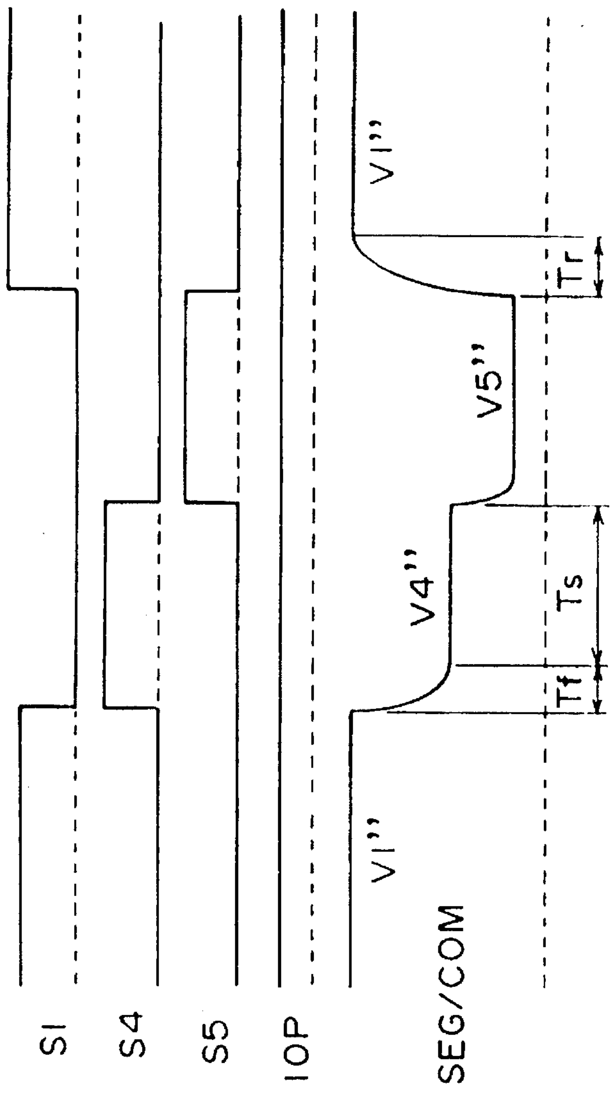
FIG. 27(A) PRIOR ART
FIG. 27(B) PRIOR ART
FIG. 27(C) PRIOR ART
FIG. 27(D) PRIOR ART
FIG. 27(E) PRIOR ART
FIG. 27 is a timing chart for a description of the operation of the device shown in FIG. 23.

FIG. 6 shows, as the operational amplifier 104, the P top type which receives a supply of the voltage VP output from the reference power supply circuit 106 for an operational amplifier. The voltage VN output of the reference power supply circuit 106 for an operational amplifier is supplied to the operational amplifier 104 of the N top type as shown in FIG. 26.

Figure 7:
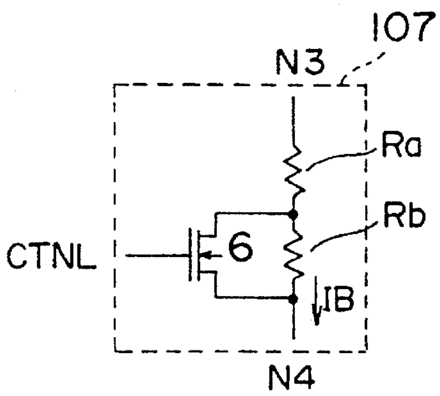
FIG. 7 is a circuit diagram of a circuit constituting a first example of a resistor variable circuit as at 107 of FIG. 6.

FIG. 7 is a circuit diagram showing a first example of the resistance variable circuit 107 of FIG. 6. As shown in FIG. 7, a resistor Ra and a resistor Rb are connected in series between a connecting node N3 and a connecting node N4. N-type MOS transistor 6 which receives the control signal CNTL at the gate thereof is connected parallelly with the resistor Rb. Thereby, in the case where the control signal CNTL is at a H level, the N-type MOS transistor 6 is turned on, and the resistance value between the connecting nodes N3 and N4 becomes small. In the case where the control signal CNTL is at a L level, the N-type MOS transistor 6 is turned off, and the resistance value between the connecting nodes N3 and N4 becomes large.

The operation of the case where the FIG. 7 circuit is applied to FIG. 6 will now be described. The current which flows from the high potential for liquid crystal VDD toward the low potential for liquid crystal VEE passes through the resistance variable circuit 107 from the P-type MOS transistor 1, passes through the N-type MOS transistor 2, and flows into the low potential for liquid crystal VEE. In the case where the control signal CNTL is at an H level, the transistor 6 is turned on. Thereby, the current flows from the connecting node N3 to the connecting node N4 through the resistor Ra and the N-type MOS transistor 6 in the ON state. It is assumed now that the resistors Ra and Rb have resistances which are sufficiently higher than those of the transistors 1, 2 and 6 in the ON state. At this time, a current IB which flows from the high potential for liquid crystal VDD to the low potential for liquid crystal VEE is substantially determined by the resistor Ra. Thereby, the connecting node on the downstream side (the voltage VP side) in the P-type MOS transistor 1 has a voltage VP such that the current IB flows. Thereby, the N-type MOS transistor 2 generates the connecting node voltage VN such that the current IB flows. It is assumed that the MOS type transistor capacity value W/L of the P-type MOS transistor 1 is 1. On the other hand, the P-type MOS transistors 30 and 35 in the operational amplifier 104 constitute a current mirror. It is assumed that the MOS type transistor capacity value W/L of the P-type MOS transistors 30 and 35 is the same as and 100 times that of the P-type MOS transistor 1. The same current as the current IB flows into the P-type MOS transistor 30, and a current which is 100 times that of the current IB flows into the P-type MOS transistor 35.

Consider now that the control signal CNTL is at a L level. At this time, the N-type MOS transistor 6 is turned off. Thereby, the resistor Ra and the resistor Rb are connected in series, and the current is reduced. It is assumed in this case that the current IB decreases to 1/10 when the transistor 6 is turned on. Currents which flow into the P-type MOS transistor 30 and the P-type MOS transistor 35 are similarly reduced to 1/10.

With the above-described arrangement, after the output potential to the segment/common capacitative load CS connected to the external connection terminal 101 in the output portion 102 has reached a sufficient level, the control signal CNTL is controlled whereby the mean value of the consumption current in the operational amplifier 104 can be reduced.

The above-described operation is similar to that in the case where the N top type circuit 104 in FIG. 26 is used in place of the operational amplifier 104 in FIG. 6, and VN in FIG. 6 and VN in FIG. 26 are connected. In this case, the transistors 1, 30 and 35 in the above description correspond to the transistors 2, 70 and 75, respectively.

Figure 8:
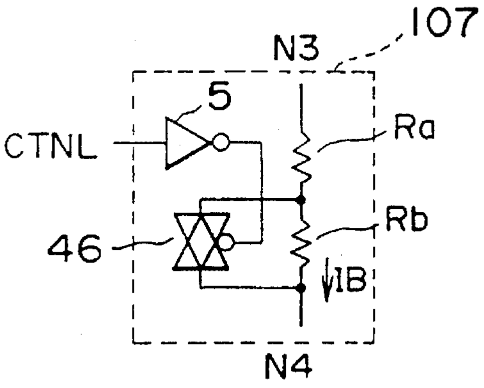
FIG. 8 is a circuit diagram of a circuit constituting a second example of a resistor variable circuit as at 107 of FIG. 6.

FIG. 8 shows a second example of the reference power supply circuit 106 for an operational amplifier as shown in FIG. 6. As will be apparent from FIG. 8, a transfer gate 46 is used in place of the N-type MOS transistor 6 in FIG. 7. The control signal CNTL is applied to the transfer gate 46 through an inverter 5. The operation is similar to that shown in FIG. 7.

Figure 9:
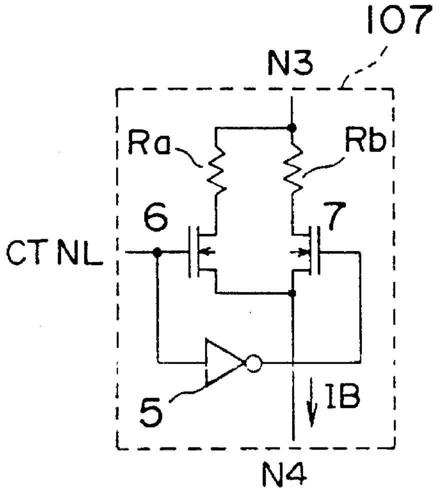
FIG. 9 is a circuit diagram of a circuit constituting a third example of a resistor variable circuit as at 107 of FIG. 6.

FIG. 9 shows a third example of the reference power supply circuit 106 for an operational amplifier as shown in FIG. 6. As will be apparent from FIG. 9, a series circuit of N-type MOS transistor 6 and resistor Ra, and a series circuit of N-type MOS transistor 7 and resistor Rb are connected in parallel between connecting nodes N3 and N4. The control signal CNTL is directly applied to the gate of the N-type MOS transistor 6 and applied to the gate of the N-type MOS transistor 7 through the inverter 5.

In FIG. 9, in the case where the control signal CNTL is at a H level, the N-type MOS transistor 6 is turned on. Substantially only the resistor Ra is present between the connecting nodes N3 and N4. In the case where the control signal CNTL is at a L level, the N-type MOS transistor 7 is turned on. Substantially only the resistor Rb is present between the connecting nodes N3 and N4. As the result, it is assumed that the resistor Rb has a resistance value higher than that of the resistor Ra. Similarly as in the case of FIG. 7, the current IB which flows between the connecting nodes N3 and N4 can be controlled.

Figure 10:
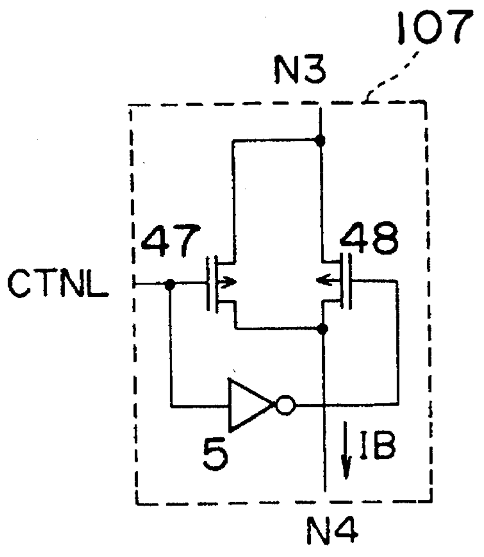
FIG. 10 is a circuit diagram of a circuit constituting a fourth example of a resistor variable circuit as at 107 of FIG. 6.

FIG. 10 shows a fourth example of the reference power supply circuit 106 for an operational amplifier. As will be apparent from FIG. 10, a parallel circuit of P-type MOS transistors 47 and 48 is connected between connecting nodes N3 and N4. The control signal CNTL is applied to the gate of the P-type MOS transistor 47, and the gate of the P-type MOS transistor 48 inputs the control signal NCNTL inverted through the converter 5.

In FIG. 10, one of the P-type MOS transistors 47 and 48 is turned on and the other is turned off in response to the levels H and L of the control signal CNTL. That is, since the resistance value of the transistor between the connecting nodes N3 and N4 changes, the current IB can be controlled, similarly as in the case of FIG. 7.

Figure 11:
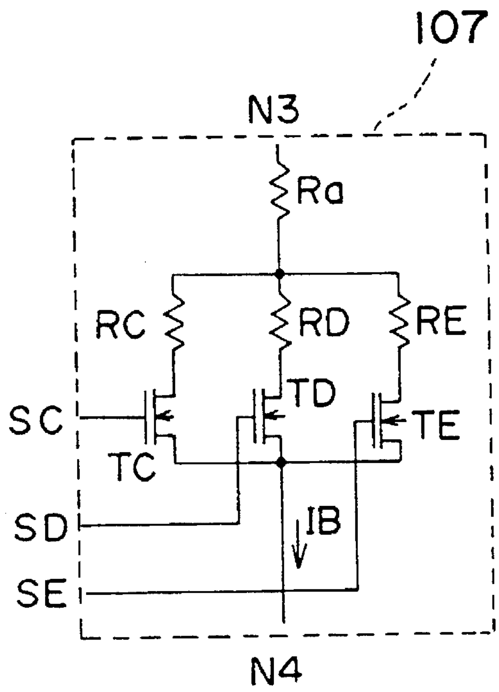
FIG. 11 is a circuit diagram of a circuit constituting a fifth example of a resistor variable circuit as at 107 of FIG. 6.

FIG. 11 shows a fifth example of the reference power supply circuit 106 for an operational amplifier shown in FIG. 6. As will be apparent from FIG. 11, this circuit is a modified example of the FIG. 9 arrangement. One end of a resistor Ra is connected to a connecting node N3, and resistors RC, RD and RE are connected in parallel to the other end of the resistor Ra. The ends of N-type MOS transistors TC, TD and TE on one side thereof are connected in series to the resistors RC, RD and RE. The other ends of the transistors TC, TD and TE are connected in parallel to a connecting node N4. Select signals SC, SD and SE are applied to gates of the N-type MOS transistors TC, TD and TE. Thereby a suitable one of the transistors TC, TD and TE can be turned on.

In FIG. 11, turning on and off of the transistors TC, TD and TE can be determined by a suitable combination of the select signals SC, SD and SE. Thereby, the resistance value between the connecting nodes N3 and N4 can be changed. Thereby, the current IB can be changed. As a result, an operation similar to that in the case of FIG. 7 can be carried out in finer control state.

Figure 12:
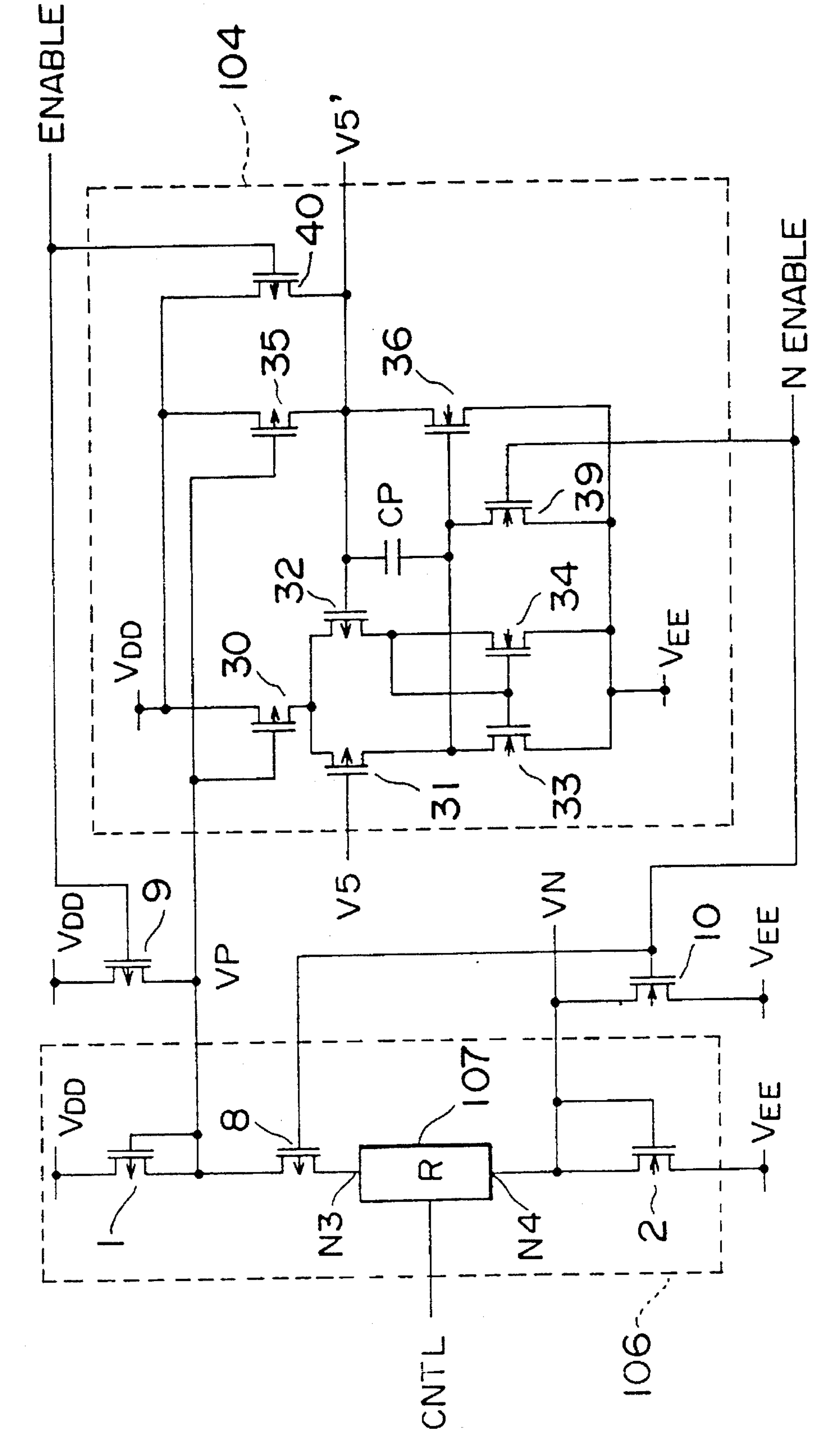
FIG. 12 is a diagram showing the constitution of a circuit representing a second example of a reference power supply circuit for an operational amplifier according to the construction shown in FIG. 5.

FIG. 12 shows a second example of the reference power supply circuit 106 shown in FIG. 5. As shown in FIG. 12, in the reference power supply circuit 106 for an operational amplifier, a P-type MOS transistor 8 is connected in series with a resistance variable circuit 107, and an inverted enable signal NEnable is inputted into the gate thereof. A P-type MOS transistor 9 is connected between the high potential for liquid crystal VDD and the voltage VP. The inverted enable signal NEnable is inputted into the gate of the transistor 9. An N-type MOS transistor 10 into whose gate is inputted the inverted enable signal NEnable is connected between the voltage VN and the low potential liquid crystal VEE. A P-type MOS transistor 40 into whose gate is inputted an enable signal Enable is connected in parallel with a P-type MOS transistor 35. An N-type MOS transistor into whose gate is inputted the inverted enable signal NEnable is connected in parallel with an N-type MOS transistor 33. In FIG. 12, elements equivalent to those shown in FIG. 6 are indicated by the same reference numerals.

In FIG. 12, in the case where the enable signal Enable is at a H level (in the case where the inverted enable signal NEable is at a L level), the transistor is in the ON state while the transistors 9, 10, 40 and 39 are in the OFF state. Therefore, the circuit of FIG. 12 is a circuit substantially equivalent to the circuit of FIG. 6 and performs an operation similar thereto.

On the other hand, in the case where the enable signal Enable is at a L level (when the inverted enable signal NEnable is at a H level), the transistor 8 is in the OFF state while the transistors 9, 10, 39 and 40 are turned ON. In this case, the current which flows between the high potential for liquid crystal VDD and the low potential for liquid crystal VEE is cut off by the P-type MOS transistor 8. The high potential for liquid crystal VDD is supplied to the gate of the P-type MOS transistor 35 through the P-type MOS transistor 9, and the P-type MOS transistor 35 is turned OFF. The N-type MOS transistor 36 is also turned OFF when the transistor 39 is turned ON or the like. Thereby, the current which flows from the high potential for liquid crystal VDD to the low potential for liquid crystal VEE is cut. However, in that state, the voltage V5' becomes floating, resulting in an erroneous lighting or blurring of the liquid crystal panel. To avoid this, when the liquid crystal panel is not used, the output voltage V5' is raised in advance to the high potential for liquid crystal VDD level by the P-type MOS transistor 40.

As described above, the operation can be selected to be enabled or disabled by applying the enable signal Enable. The voltage VN of the reference power supply circuit 106 for an operational amplifier is connected to the operational amplifier 104 of the N top type as shown in FIG. 26. Also in this case, the enable signal Enable and the inverted enable signal NEnable are applied together with the transistors which have a function similar to that of the transistors 8, 0, 10, 40 and 39 used in the circuit of FIG. 2, thereby obtaining a function similar to that as described above.

Figure 13:
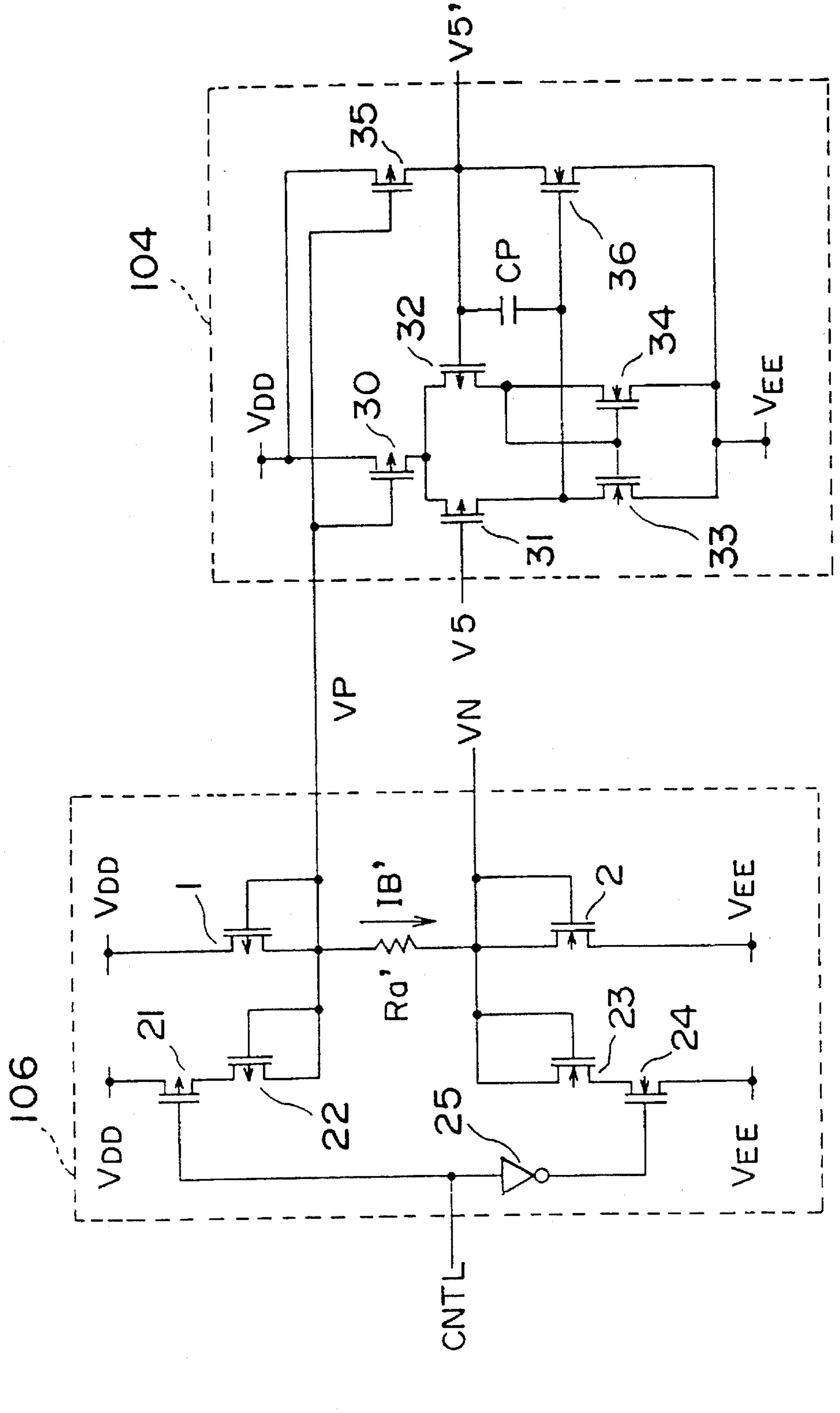
FIG. 13 is a diagram showing the constitution of a circuit representing a third example of a reference power supply circuit for an operational amplifier according to the construction shown in FIG. 5.

FIG. 13 is a circuit diagram showing a third example of the reference power supply circuit 106 shown in FIG. 5. As shown in FIG. 13, a series circuit of P-type MOS transistors 21 and 22 is connected in parallel with a P-type MOS transistor 1 of the reference power supply circuit 106. A series circuit of N-type MOS transistors 23 and 24 is connected in parallel with a transistor 2. The gate of the P-type MOS transistor 22 is connected to the drain thereof, and the drain of the N-type MOS transistor 23 is connected to the gate thereof. The source, drain and gate of the P-type MOS transistor 21 are connected to the high potential for liquid crystal VDD, the source of the P-type MOS transistor 22, and the control signal CNTL, respectively. The source, drain and gate of the N-type MOS transistor 24 are connected to the low potential for liquid crystal VEE, the source of the N-type MOS transistor 23, and the control signal CNTL through an inverter 25, respectively. Resistor Ra' is connected between the drain of the P-type MOS transistor 1 and the drain of the N-type MOS transistor 2.

In FIG. 13, in the case where the control signal CNTL is at a H level, both the transistors 21 and 24 are turned OFF. Because of this, the current which flows from the high potential VDD to the low potential VEE is determined by the transistor 1, the resistor Ra' and the transistor 2. The current IB' flows into the resistor Ra'. In the operational amplifier 104, it is assumed that the mirror ratios of the transistors 30 and 35 are 1 time and 100 times, respectively, with respect to the P-type MOS transistor 1. A current of the current IB' flows through the P-type MOS transistor 1. Therefore, the current IB' flows through the transistor 30, and a current of the current IB'×100 flows through the transistor 35.

On the other hand, when the control signal CNTL is at a L level, the operation is then as follows. That is, the transistors 21 and 24 are turned ON. Thereby, the series circuit of transistors 21 and 22 is connected in parallel with the transistor 1, and the series circuit of transistors 23 and 24 is connected in parallel with the transistor 2. It is assumed here that the ON resistance of the transistors is extremely low compared to that of the resistor Ra' so that the current flowing through the resistor Ra' rarely changes and is the current IB'. Further, it is assumed that the MOS type transistor capacity value W/L of the P-type MOS transistors 21 and 22 is set to N times that of the P-type MOS transistor 1. At this time, the total transistor capacity value W/L of the transistors 21 and 22 is N+1 times, and the flow-out current of these transistors and the transistors 30 and 35 which form a current mirror decreases to 1/(N+1) times. The mean value of the current at the operational amplifier 104 can be reduced by the control signal CNTL.

Also in the case where the operational amplifier 104 connected to the voltage VN of the reference power supply circuit 106 for an operational amplifier is of the N top type as shown in FIG. 26, the current flowing through the N-type MOS transistors 70 and 75 is controlled similarly as in the above case and the current consumption can be reduced.

Figure 14:
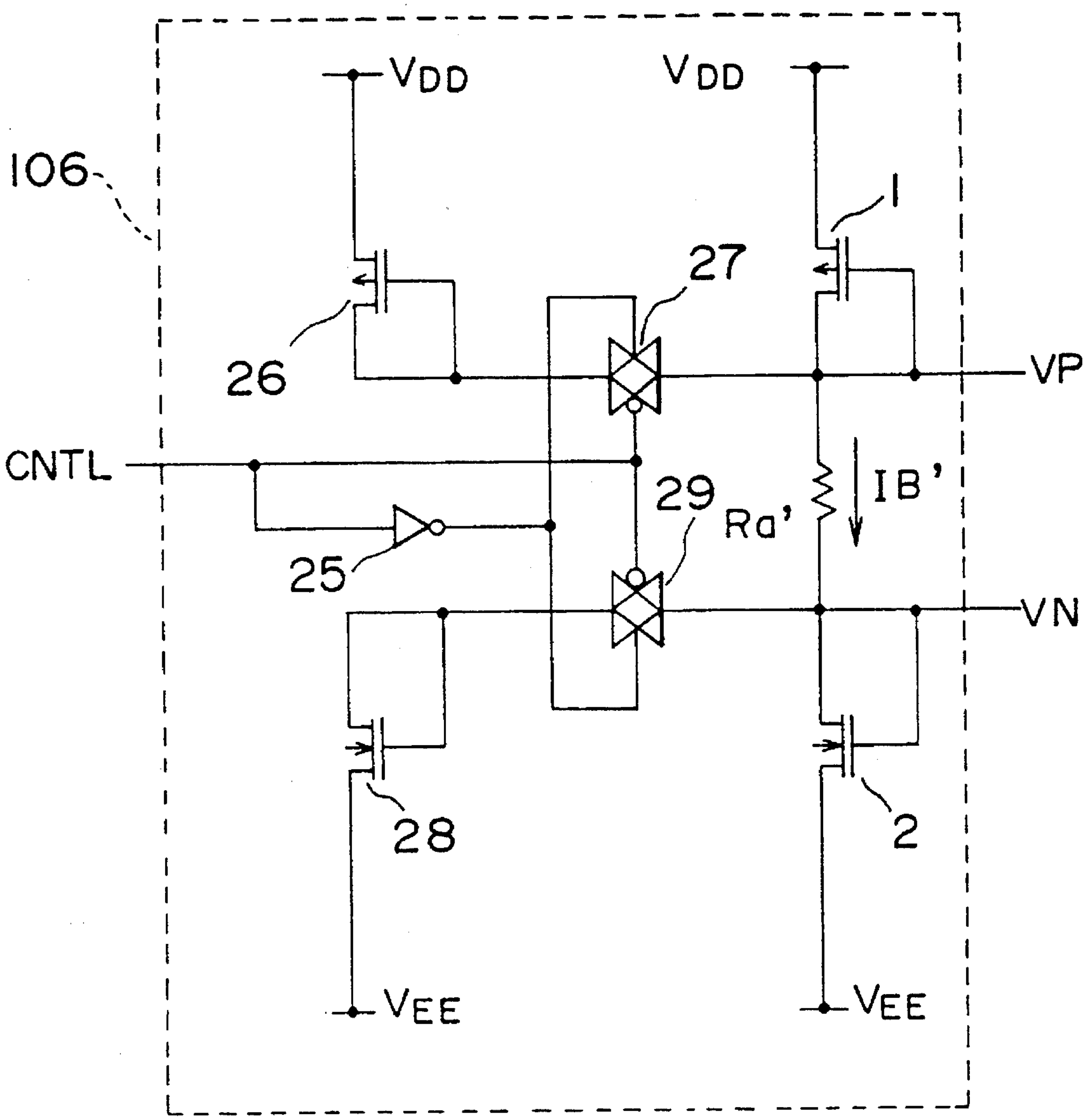
FIG. 14 is a circuit diagram of a circuit constituting a fourth example of a reference power supply circuit for an operational amplifier according to the construction shown in FIG. 5.

FIG. 14 shows a fourth example of the reference power supply circuit 106 shown in FIG. 5. As shown in FIG. 14, a P-type MOS transistor 26 is connected in parallel with a transistor 1 so that the former can be disconnected by a transfer gate 27. An N-type MOS transistor 28 is connected in parallel with an N-type MOS transistor 2 so that the former can be disconnected by a transfer gate 29. The control signal CNTL and the signal inverted by an inverter 25 are inputted into the transfer gates 27 and 29. In the case where the control signal CNTL is at a H level, the transfer gates 27 and 29 are turned OFF. In the case where the control signal CNTL is at a L level, the transfer gates 27 and 29 are turned ON.

The operation of the FIG. 14 circuit is substantially similar to that of the circuit of FIG. 13. That is, if the MOS type transistor capacity value W/L of the P-type MOS transistor 26 and the N-type MOS transistor 28 is suitably set, the operation and effect substantially similar to those of the circuit of FIG. 13 are obtained.

According to the circuit in which the MOS type transistor capacity value W/L of the transistors as described above is made variable, the chip area of the semiconductor integrated circuit can be made smaller than that of the circuit in which the resistances are selected and made variable as shown in FIGS. 7, 8, 9, and 11. That is, a large area is required in order to provide a high resistance value by a semiconductor. However, in the case where a current value is controlled merely by the ratio-by the transistors, a small area of the transistor will suffice, less influencing the chip area.

Figure 15:
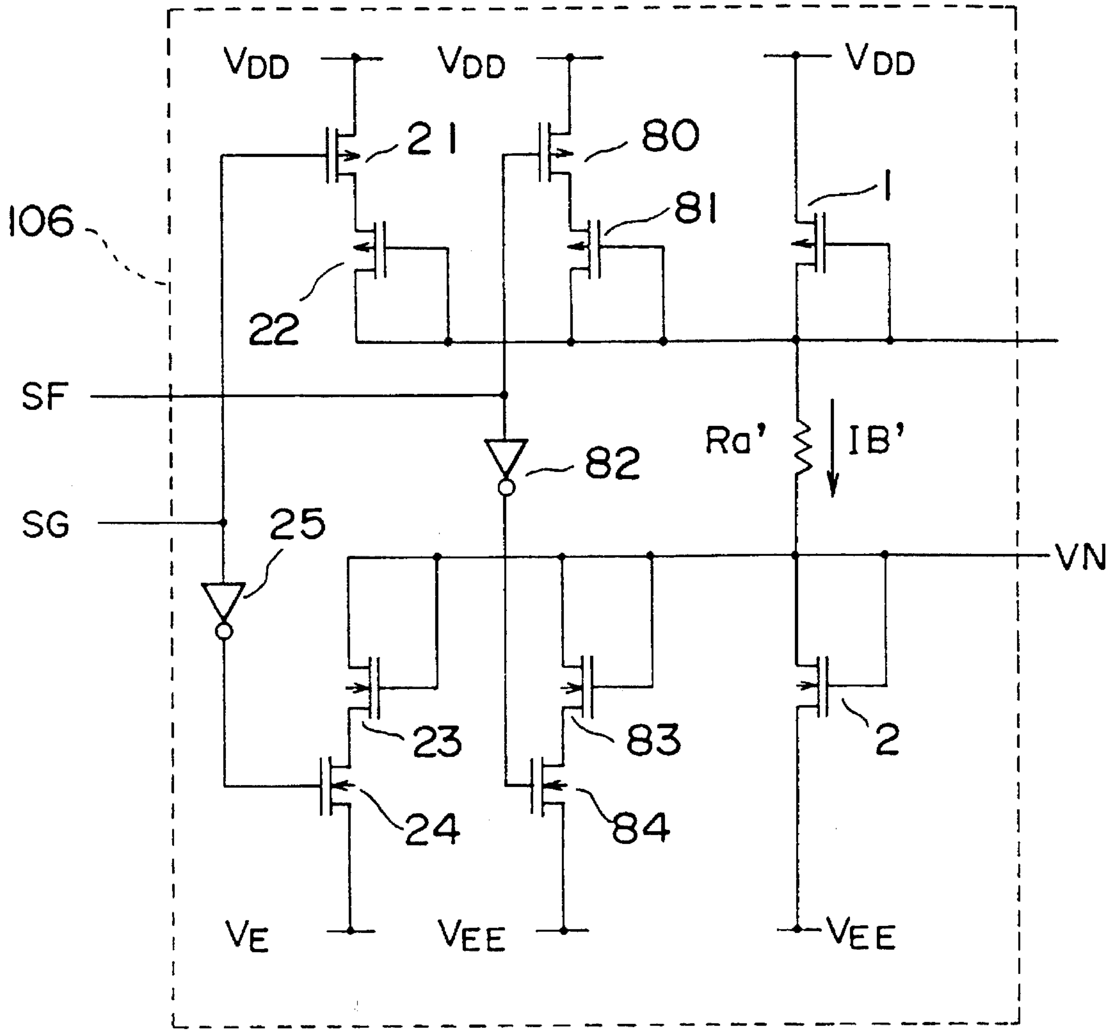
FIG. 15 is a circuit diagram of a circuit constituting a fifth example of a reference power supply circuit for an operational amplifier according to the construction shown in FIG. 5.

FIG. 15 shows a fifth example of the reference power supply circuit 106 shown in FIG. 5. As shown in FIG. 15, a series circuit of transistors 21 and 22, and a series circuit of transistors 80 and 81 are connected in parallel with a transistor 1 in the reference power supply circuit 106. A series circuit of transistors 23 and 24, and a series circuit of transistors 83 and 84 are connected in parallel with a transistor 2. The gate of the transistor 22 is connected to the drain thereof, and the drain of the transistor 23 is connected to the gate thereof. On the other hand, the source, drain and gate of the transistor 21 are connected to the high potential for liquid crystal VDD, the source of the P-type MOS transistor 22, and a select signal SG, respectively. The gate of the transistor 81 is connected to the drain thereof, and the drain of the transistor 83 is connected to the gate thereof. On the other hand, the source, drain and gate of the transistor 80 are connected to the high potential for liquid crystal VDD, the source of the transistor 81, and a select signal SF, respectively. The source, drain and gate of the transistor 24 are connected to the low potential for liquid crystal VEE, the source of the N-type MOS transistor, and a select signal SG through an inverter 25, respectively. The source, drain and gate of the transistor 84 are connected to the low potential for liquid crystal VEE, the source of the transistor 83, and a select signal SF through an inverter 82, respectively. A resistor Ra' is connected between the drain of the transistor 1 and the drain of the transistor 2.

According to the circuit of FIG. 15, the current flowing through the operational amplifier 104 can be further finely controlled by the select signals SF and SG than in the case of the circuit of FIG. 13. This provides a preferable circuit in adjusting the drive capacity with respect to the capacity (load capacity) of a liquid crystal panel connected to the outside.

Figure 16:
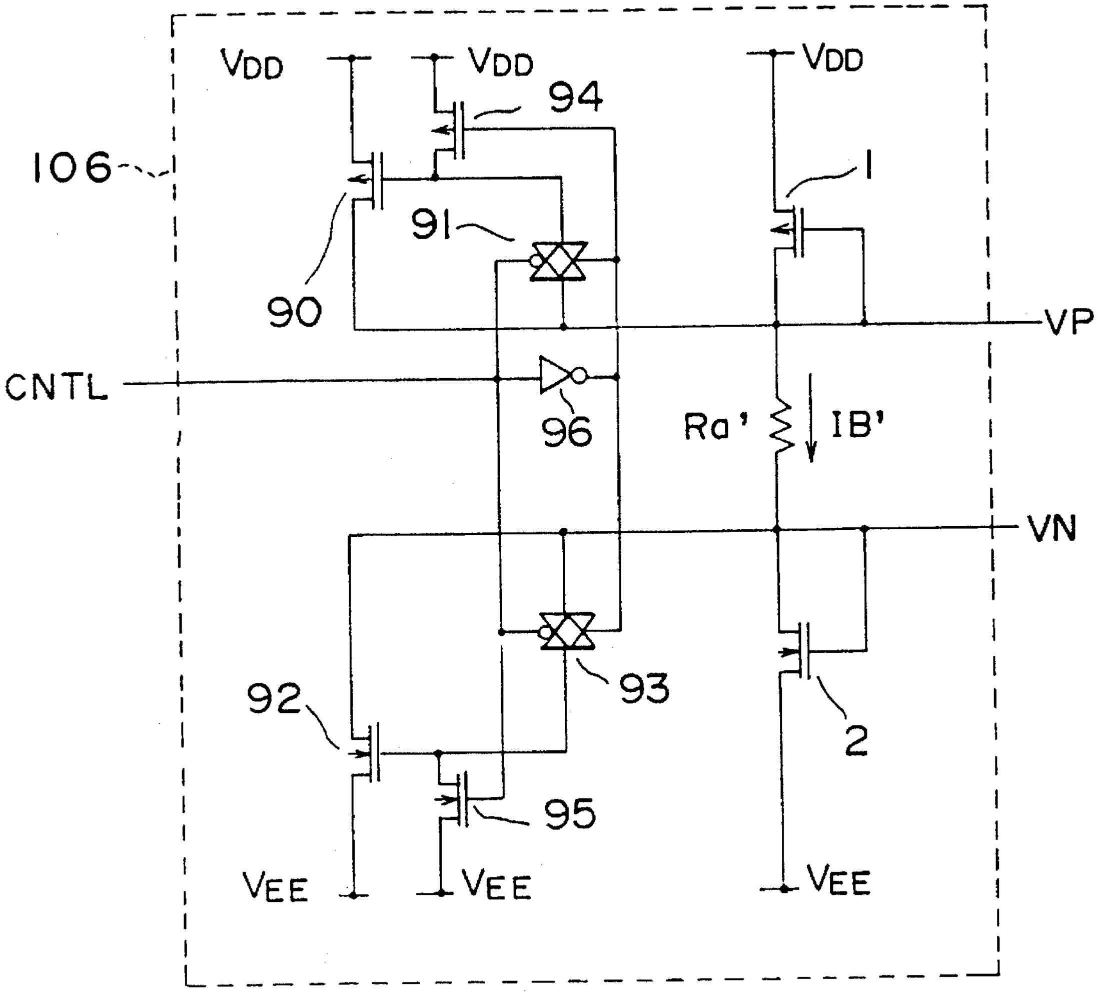
FIG. 16 is a circuit diagram of a circuit constituting a sixth example of a reference power supply circuit for an operational amplifier according to the construction shown in FIG. 5.

FIG. 16 shows a sixth example of the reference power supply circuit 106 shown in FIG. 5. As shown in FIG. 16, a P-type MOS transistor 90 is connected to the voltage VP in parallel with a transistor 1. An N-type MOS transistor 92 is connected to the voltage VN in parallel with an N-type MOS transistor 2. The gate of the transistor 90 is connected to the voltage VP through a transfer gate 91, and to the high potential for liquid crystal VDD through a P-type MOS transistor 94. The gate of the N-type MOS transistor is connected to the voltage VN through a transfer gate 93 and to the low potential for liquid crystal VEE through an N-type MOS transistor 95. The control signal CNTL and an inverted signal of the control signal CNTL obtained by an inverter 96 are inputted into the transfer gates 91 and 93. The inverted signal of the control signal CNTL is inputted into the gate of the P-type MOS transistor 94 from the inverter 96. The control signal CNTL is inputted into the gate of the N-type MOS transistor 95.

In FIG. 16, the gate input ends of the transistors 90 and 92 are connected to the voltages VP and VN, respectively, since when the control signal CNTL is at a L level, both the transfer gates 91 and 93 are turned ON. On the other hand, when the control signal CNTL is at a H level, the gate of the P-type MOS transistor 90 is locked to the high potential for liquid crystal VDD through the P-type MOS transistor 94, and the gate of the N-type MOS transistor 92 is locked to the low potential for liquid crystal VEE through the N-type MOS transistor 95. Thereby, when the transfer gates 91 and 93 are turned OFF, the P-type MOS transistor 90 and the N-type MOS transistor 92 are in the floating state so that they are not turned OFF. The P-type MOS transistor 91 and the N-type MOS transistor 92 can readily set the size and the capacity value W/L of the MOS type transistor with respect to the P-type MOS transistor 1 and the N-type MOS transistor 2 of the same kind. Therefore, when the MOS type transistor capacity value W/L of the P-type MOS transistor 90 is made four times that of the P-type MOS transistor 1, four transistors similar to the P-type MOS transistor 1 are arranged in parallel in place of the P-type MOS transistor, or the L (channel length) is made constant and the W (channel width) is made four times. Then the MOS type transistor capacity value W/L of four times can be easily realized.

According to the circuit of FIG. 16, the MOS type transistor capacity value W/L can be controlled without taking the ON resistance of the transistors 21 and 22 in FIG. 13 and the influence of the transfer gates 27 and 29 in FIG. 14 into consideration. Therefore, setting the current consumption and designing the transistors can be accomplished in an extremely simple and positive manner.

Figure 17:
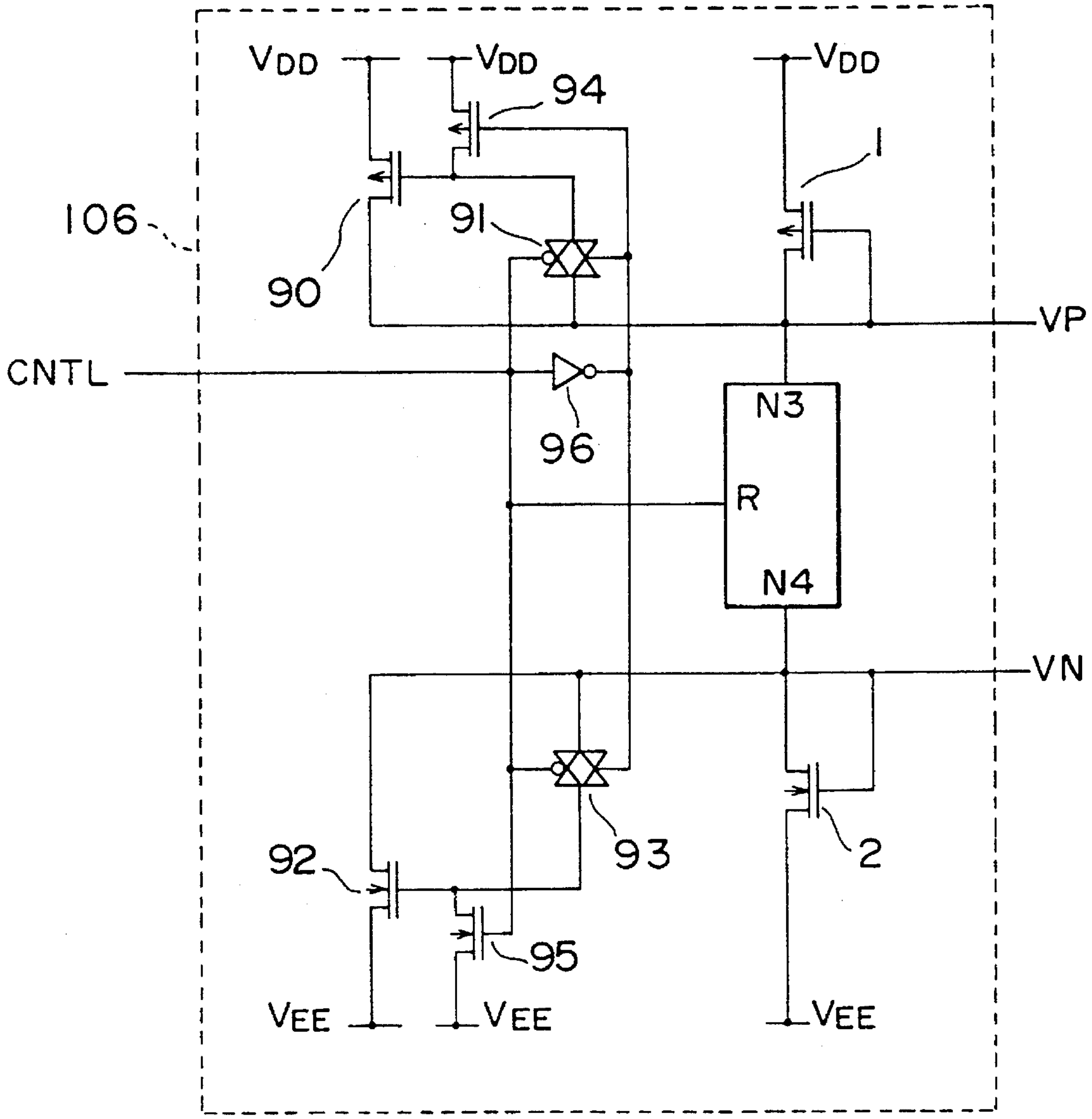
FIG. 17 is a circuit diagram of a circuit constituting a seventh example of a reference power supply circuit for an operational amplifier according to the construction shown in FIG. 5.

FIG. 17 shows a seventh example of the reference power supply circuit 106 in FIG. 5. As shown in FIG. 17, the resistance variable circuit 107 shown in FIG. 6 is used in place of the resistor Ra' shown in FIG. 16. As the resistance variable circuit 107, those shown in FIGS. 7 to 11 can be applied.

Even if the resistance variable circuit 107 as shown in FIGS. 7 to 11 is applied in place of the resistor Ra' shown in FIGS. 13, 14, and 15, similarly as in the circuit shown in FIG. 17, an effect similar thereto can be obtained.

Figure 18:
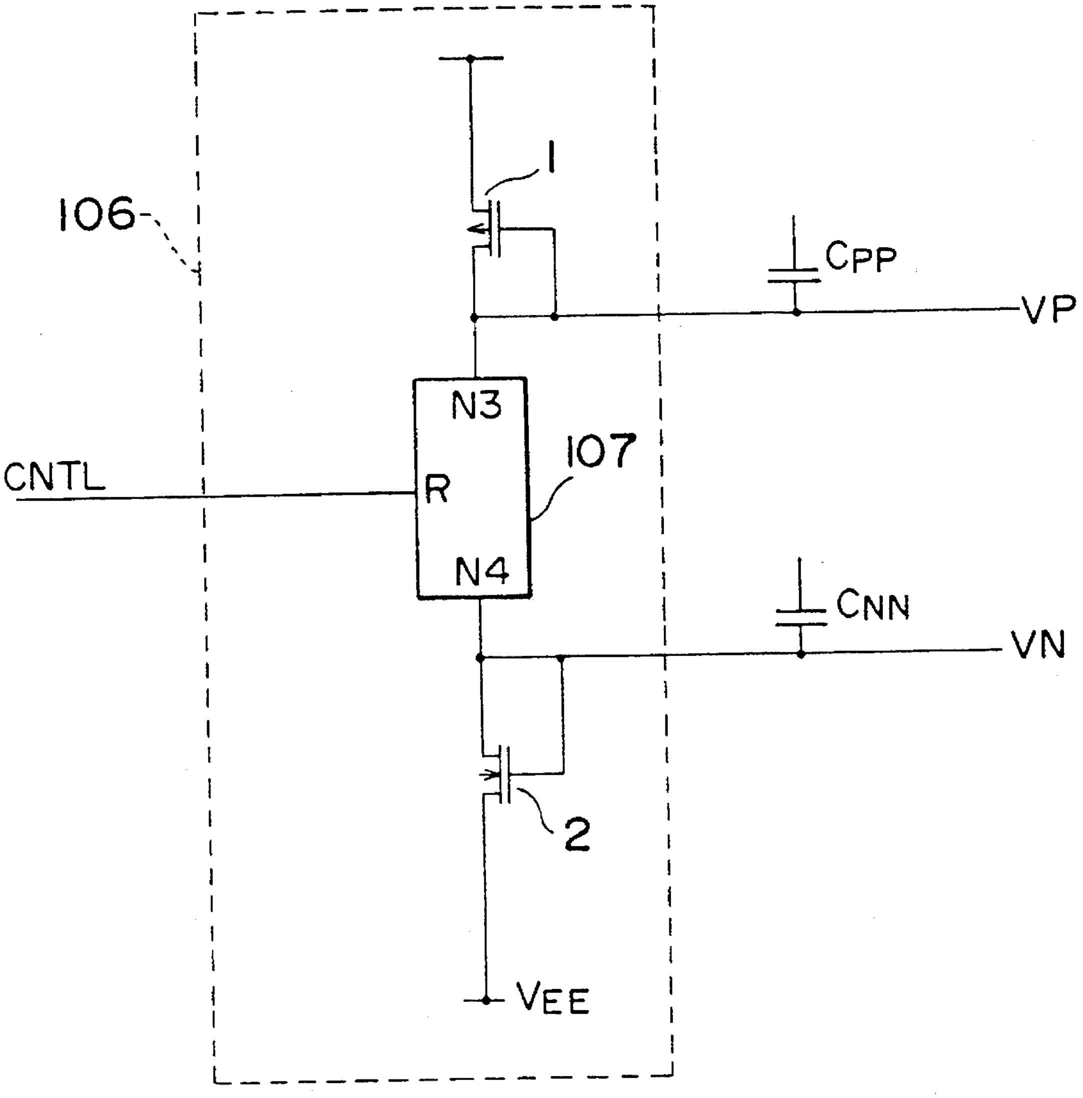
FIG. 18 is a circuit diagram of a circuit constituting an eighth example of a reference power supply circuit for an operational amplifier according to the construction shown in FIG. 5.

FIG. 18 is a diagram showing the circuit organization of an eighth example of the reference power supply circuit 106 shown in FIG. 5. FIG. 18 illustrates an organization in which a capacitor CPP and a capacitor CNN are connected to output portions of the voltage VP and the voltage VN, respectively.

In FIG. 5, it is assumed that the capacity of the operational amplifier 104 or the current consumption is switched by the control signal CNTL. In the operational amplifier 104 as shown in FIG. 19, even if the voltage V1 to be inputted is constant, when the control signal CNTL is switched as shown in FIG. 20(A), the output voltage V1' fluctuates somewhat as shown in FIG. 20(B). This fluctuation varies with the capacity of the operational amplifier 104 and so forth but is not preferable as the capacity of the operational amplifier which provides a determined constant potential. The noise which occurs when the control signal CNTL is at a L level somewhat takes time for its attenuation as compared with the noise which occurs when the control signal CNTL is at a H level, in view of the fact that the capacity of the operational amplifier is small. The cause is that since the resistance in the reference power supply circuit 106 is abruptly changed by the control signal CNTL, the current flowing through the resistor changes, and therefore the voltage VP and the voltage VN which are outputs of the reference power supply circuit 106 for an operational amplifier are also abruptly fluctuated, and the comparison portion in the operational amplifier 104 cannot follow the fluctuation. Accordingly, as shown in FIG. 18, the capacitors CPP and CNN' are connected to the voltage VP and the voltage VN to thereby gently fluctuate the voltages VP and VN so that the operational amplifier 104 can follow the fluctuation. With this arrangement, the noise of the output of the operational amplifier 104 can be reduced, and a positive output corresponding to the input can be obtained.

Figure 21:
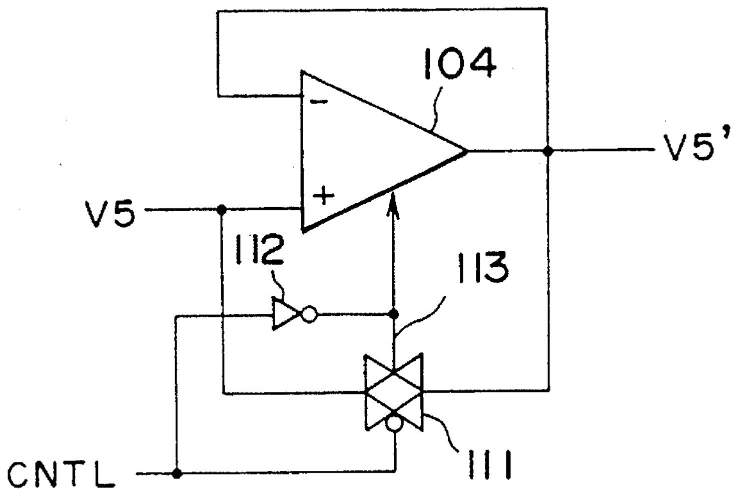
FIG. 21 is a circuit diagram of a circuit constituting another example of an operational amplifier shown in FIGS. 2 and 3.

FIG. 21 shows another example of the operational amplifier 104 shown in FIG. 1. In FIG. 21, the operational amplifier has an operation stop function. Voltage V5 is connected to voltage V5' through a transfer gate 111. The control signal CNTL is directly applied to the transfer gate 111 and applied to a connecting node 113 through an inverter 112. The operation of the operational amplifier 104 is stopped by a potential of the anode 113 which is the output of the inverter 112.

FIGS. 2 and 3 illustrate a circuit in which the capacity of the operational amplifier 104 is switched by the control signal CNTL. In general, the operational amplifier 104 requires a large current supply capacity with respect to the segment/common capacitative load CS when the output voltage is changed. To this end, in FIG. 21, the control signal CNTL is set to the H level to render the operational amplifier 104 operable, and the voltage V5 from the divider circuit 105 is converted in impedance and supplied as V5' to the power supply wiring 103. In the case where merely sustaining the output voltage is sufficient, the control signal CNTL is set to the L level, and the operation of the operational amplifier 104 is stopped, the transfer gate 111 being turned ON so that the voltage V5 is outputted as the voltage V5' as it is to reduce the power consumption.

In the case where the operational amplifier 104 specifically employs the arrangement shown in FIGS. 2 and 3, the operation thereof is stopped in the following manner. When the level of the connecting node 113 in FIG. 21 is at a H level, the P-type MOS transistors 35 and 38 (FIG. 2) and the N-type MOS transistor 36 (FIG. 2) may be positively turned OFF or the N-type MOS transistors 75 and 78 (FIG. 3) or the P-type MOS transistor 76 (FIG. 3) may be positively turned OFF. That is, basically, there is provided a circuit in which the P-type MOS transistor 40 of the arrangement shown in FIG. 12 is removed, and the CNTL signal and the connecting node 113 signal are inputted into the Enable and NEnable, respectively.

It is to be noted that the circuit for supplying the operational amplifier bias OP-Bias and the operational amplifier bias OP-Bias' is so controlled that the current will not flow from the high potential for liquid crystal VDD to the low potential for liquid crystal VEE, by which arrangement the power consumption can be further reduced.

Figure 22:
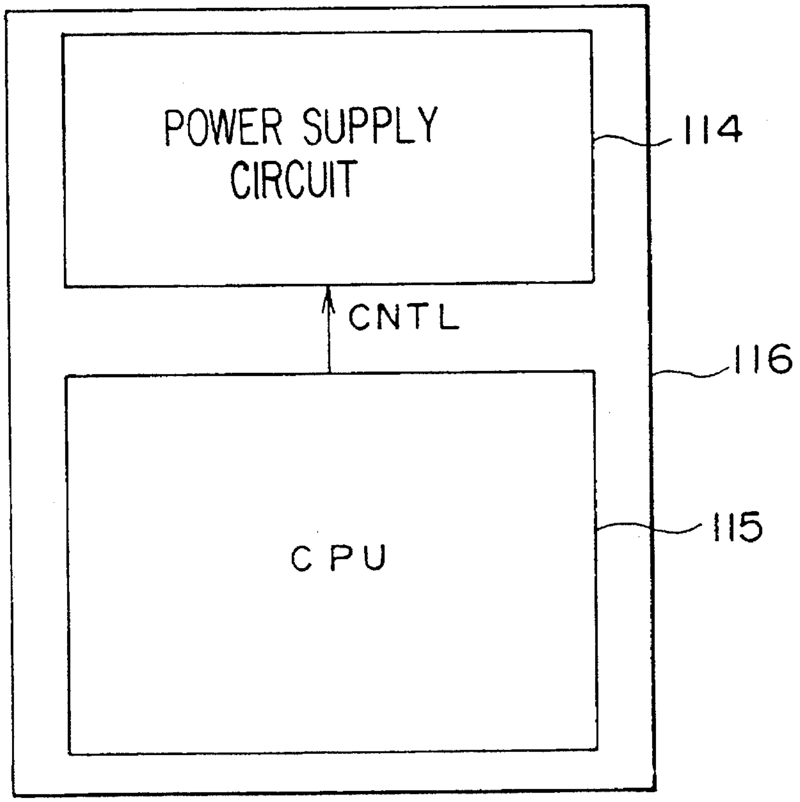
FIG. 22 is a block diagram for a description of a method for supplying a control signal.
Figure 23:
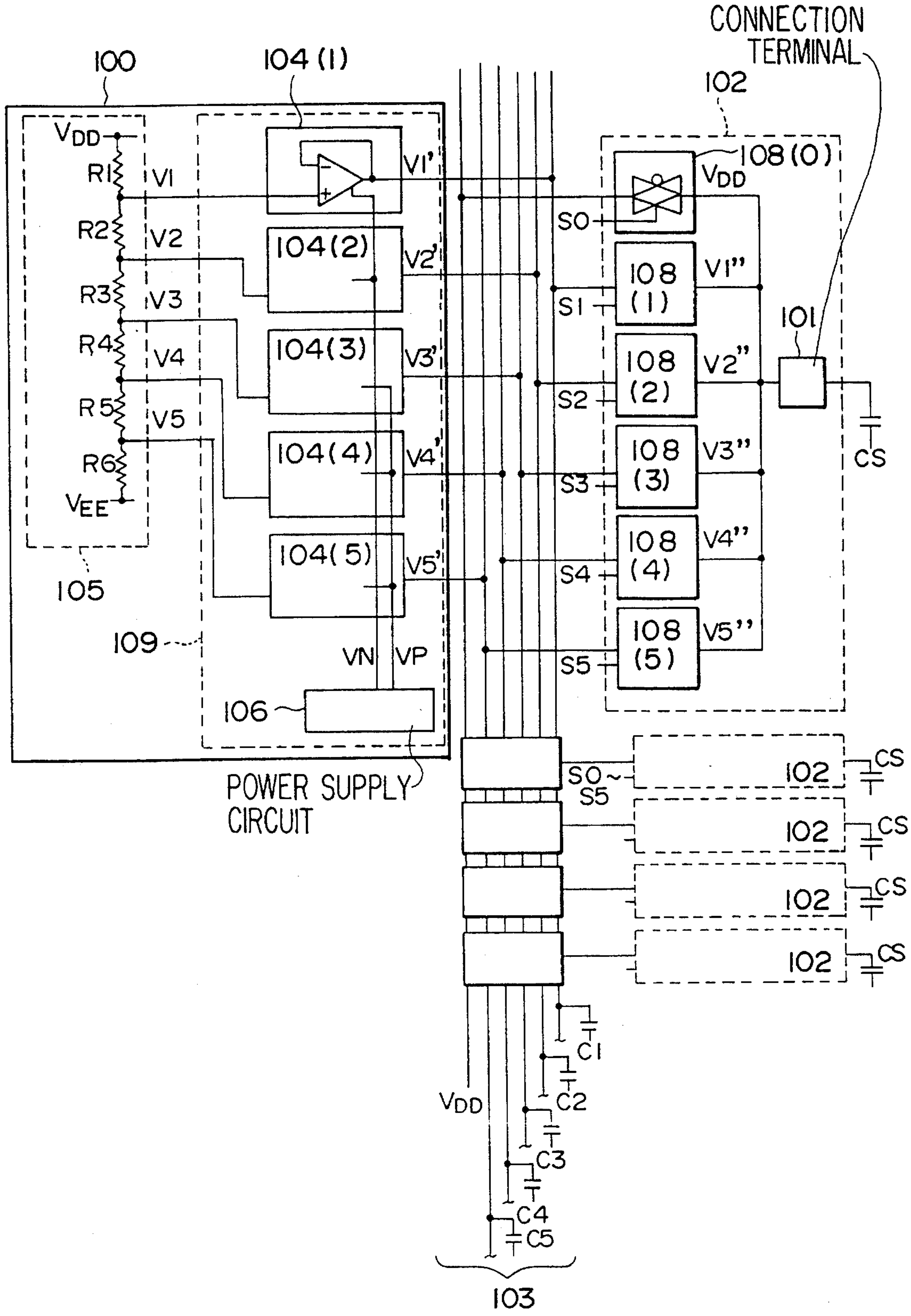
FIG. 23 PRIOR ART
FIG. 23 is a diagram showing the constitution of a circuit of a conventional liquid crystal driving power supply device.
Figure 24:
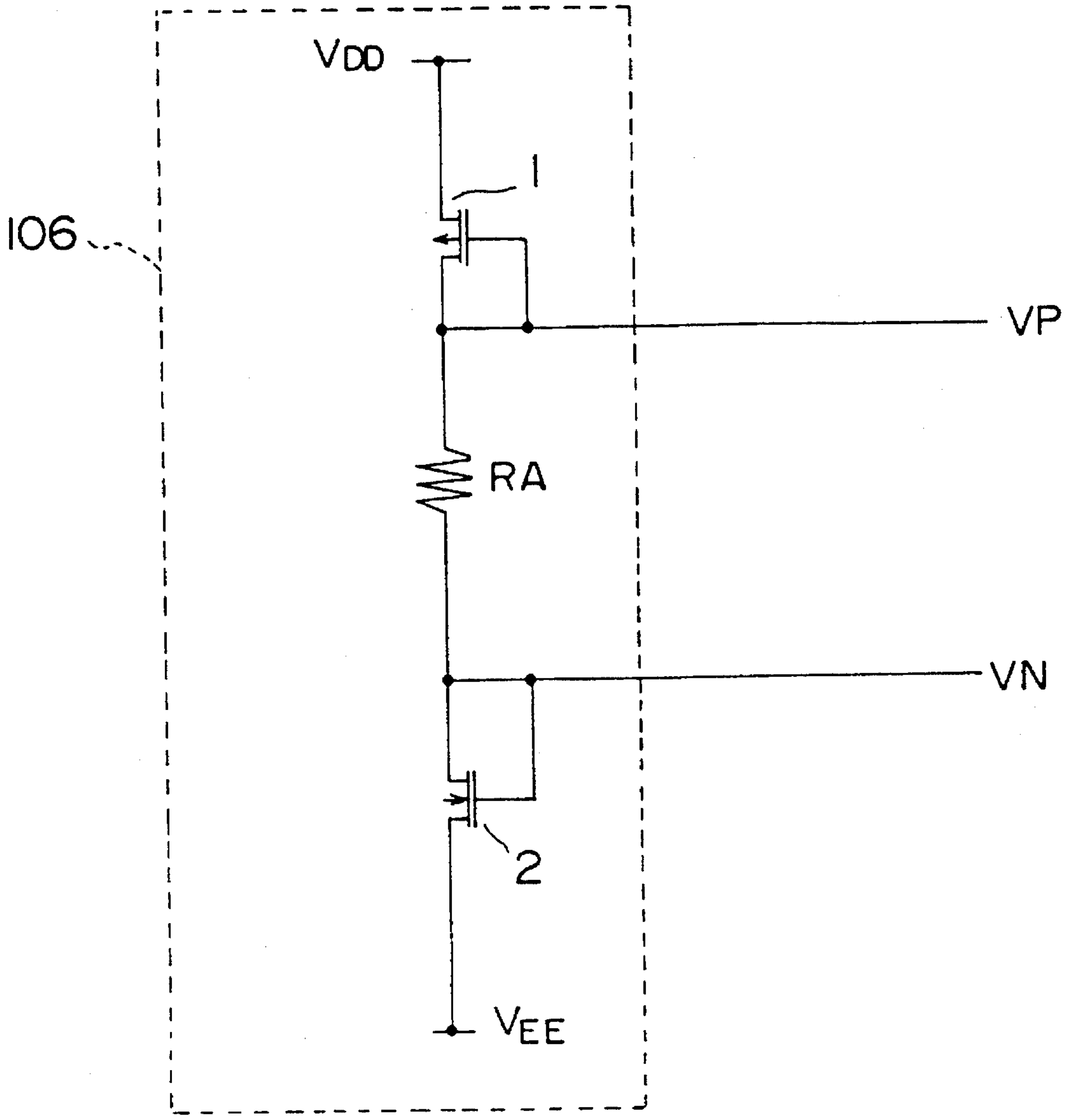
FIG. 24 PRIOR ART
FIG. 24 is a circuit diagram of a circuit constituting an example of a reference power supply circuit for an operational amplifier shown in FIG. 23.

The devices having a crystal oscillator for the display of liquid crystal such as a watch and an oscillator such as cerarock have a reference oscillation source of 32,768 KHz. Therefore, the control signal CNTL can be produced from the aforesaid oscillation source. On the other hand, as shown in FIG. 22, which is a block diagram, in the case where the liquid crystal displaying power supply circuit 114 shown in the previous embodiments is incorporated into the semiconductor integrated circuit 116 together with the CPU 115, the control signal CNTL may be supplied from the CPU 115. In this case, a clock signal used for the CPU 115 may be divided for use or may be generated using a prescaler or the like encased in the CPU 115.

The examples of the circuit organizations of the various functional portions shown above are typical examples. It is to be noted that the respective functions can be combined so as to perform a function in a mutually compensating manner. Further, various combinations within the scope of the present invention can be made.

What is claimed is:

1. A semiconductor device for a liquid crystal panel driving power supply, said device being formed on a semiconductor substrate, comprising:

a plurality of operational amplifiers each for converting a first respective input reference voltage inputted into an input terminal thereof into a second respective output reference voltage by achieving an impedance conversion to output said second respective second reference voltage to an output terminal, wherein each operational amplifier comprises:

a first switching element connected between said output terminal and a current supplying power supply; and a series circuit of a second switching element and a third switching element connected in parallel with said first switching element;

a bias signal for rendering said operational amplifier operable which is applied to control terminals of said first and second switching elements; and a control signal applied to a control gate of said third switching element, said control signal increasing a current supply capacity of the operational amplifier during a period after said first reference voltage has been applied to said input terminal until said second reference voltage at said output terminal reaches said first reference voltage, and decreasing said current supply capacity after said second reference voltage has reached said first reference voltage.

2. A device as claimed in claim 1, wherein said first reference voltage is produced by resistance-dividing a voltage between a high voltage power supply and a low voltage power supply.

3. A device as claimed in claim 2, wherein said current supply power supply is a high voltage side power supply.

4. A device as claimed in claim 2, wherein said current supplying power supply is a low voltage side power supply.

5. A device as claimed in claim 1, wherein said control signal is applied from a CPU of a microprocessor formed on the substrate.

6. A semiconductor device for a liquid crystal panel driving power supply, said device being formed on a semiconductor substrate, comprising:

a divider circuit for resistive-dividing a voltage between a high voltage power supply and a low voltage power supply to output a plurality of first reference voltages which are different from each other;

a plurality of operational amplifiers each having an input terminal to which is applied one of said first reference voltages, for converting said first reference voltages into second reference voltages by achieving impedance conversions to output said second reference voltages to output terminals, wherein each operational amplifier comprises:

a first switching element connected between said output terminal and a current supplying power supply; and a series circuit of a second switching element and a third switching element connected in parallel with said first switching element;

a bias signal for rendering said operational amplifier operable which is applied to control terminals of said first and second switching elements; and a control signal applied to a control gate of said third switching element, said control signal increasing a current supply capacity of the operation amplifier during a period after said first reference voltage has been applied to said input terminal until said second reference voltage at said output terminal reaches said first reference voltage, and decreasing said current supply capacity after said second reference voltage has reached said first reference voltage.

7. A device as claimed in claim 6, wherein said current supplying power supply in a predetermined number of said operational amplifiers to which are applied high voltage side first reference voltages out of said first reference voltages outputted from said divider circuit is a low voltage side power supply; and said current supplying power supply in other said operational amplifiers to which are applied low voltage side first reference voltages out of said first reference voltages outputted from said divider circuit is a high voltage side power supply.

8. A device as claimed in claim 7, further comprising a plurality of output means for selecting one out of said second reference voltages to output the same.

9. A device as claimed in claim 6, wherein said control signal is supplied from a CPU of a microprocessor formed on the substrate.

10. A semiconductor device for a liquid crystal panel driving power supply, said device being formed on a semiconductor substrate, comprising:

a plurality of operational amplifiers each for converting a first respective input reference voltage inputted to an input terminal thereof to a second respective output reference voltage by achieving an impedance conversion to output said second respective output reference voltage to an output terminal; and a reference power supply circuit for outputting a bias signal to the plurality of operational amplifiers as a signal having a value corresponding to a control signal inputted thereinto, said reference power supply circuit comprising a series circuit of an in-circuit transistor and a resistance variable circuit having a resistance changed according to said control signal connected between a high voltage side power supply and a low voltage side power supply, a gate of said in-circuit transistor being connected to a connecting node between said in-circuit transistor and said resistance variable circuit, and wherein said connecting node is a bias output terminal for outputting said bias signal.

11. A device as claimed in claim 10, wherein said bias signal is transmitted to said operational amplifier through a smoothing capacitor.

12. A device as claimed in claim 10, wherein said control signal is supplied from a CPU of a microprocessor formed on the substrate.

13. A device as claimed in claim 10, wherein said bias signal is applied as a signal for enhancing said current drive capacity during a period after said first reference voltage has been Applied to said input terminal until said second reference voltage at said output terminal reaches said first reference voltage, and as a signal for lowering said current drive capacity after said second reference voltage has reached said first reference voltage.

14. A device as claimed in claim 10, wherein said in-circuit transistor is connected between said high voltage side power supply and said resistance variable circuit.

15. A device as claimed in claim 10, wherein said in-circuit transistor is connected between said low voltage side power supply and said resistance variable circuit.

16. A device as claimed in claim 10, wherein said in-circuit transistor comprises two transistors, one of them being connected between said high voltage side power supply and said resistance variable circuit while the other of them being connected between said low voltage side power supply and said resistance variable circuit, and said bias signal is applied to said operational amplifier from either of said two bias output terminals.

17. A device as claimed in claim 10, wherein in said reference power supply circuit, a series circuit of said in-circuit transistor, said resistance variable circuit and an enable switching element is connected between said high voltage side power supply and said low voltage side power supply, said enable switching element being turned ON when said device is in an operating state and being turned OFF when said device is in a non-operating state.

18. A device as claimed in claim 17, wherein said operational amplifier comprises a plurality of circuit elements connected between the high voltage side power supply and the low voltage side power supply, and when said device is in said non-operating state, the circuit connecting said high voltage side power supply with said low voltage side power supply is turned OFF, and said output terminal is connected to either said high voltage side power supply or said low voltage side power supply.

19. A device as claimed in claim 10, wherein:

in said reference power supply circuit, a transistor circuit and a resistor are connected in series between the high voltage side power supply and the low voltage side power supply; wherein a transistor capacity of the transistor circuit is switched by the control signal applied thereto; and said bias signal is outputted from the connecting node between said transistor circuit and said resistor.

20. A device as claimed in claim 19, wherein said transistor circuit is connected between said high voltage side power supply and said resistance variable circuit.

21. A device as claimed in claim 19, wherein said transistor circuit is connected between said low voltage side power supply and said resistance variable circuit.

22. A device as claimed in claim 19, wherein said transistor circuit comprises two transistor circuits, one of them being connected between said high voltage side power supply and said resistance variable circuit while the other of them being connected between said low voltage side power supply and said resistance variable circuit, and said bias signal is applied to said operational amplifier from either of said two bias output ends.

23. A device as claimed in claim 19, wherein: said transistor circuit has first to third transistors connected in parallel between at least one of said high voltage side power supply and said low voltage side power supply and said resistor; said first transistor and transistors in said operational amplifier constitute a current mirror circuit; gates of said first to third transistors are connected to a connecting node between said first transistor and said resistor; and either said second or third transistor is selectively connected or disconnected in parallel with said first transistor by said control signal.

24. A device as claimed in claim 23, wherein said resistor is a variable resistor in which the resistance value is changed by said control signal.

25. A semiconductor device for a liquid crystal panel driving power supply, said device being formed on a semiconductor substrate, comprising:

a plurality of operational amplifiers each for converting a first respective input reference voltage inputted to an input terminal thereof to a second respective output reference voltage by achieving an impedance conversion to output said second respective Output reference voltage to an output terminal;

a reference power supply circuit for outputting a bias signal to the plurality of operational amplifiers as a signal having a value corresponding to a control signal inputted thereinto, wherein said reference power supply circuit comprises a transistor circuit and a resistor connected in series between the high voltage side power supply and the low voltage side power supply; wherein a transistor capacity is switched by the control signal applied thereto; and said bias signal is outputted from the connecting node between said transistor circuit and said resistor;

wherein said transistor circuit comprises a first transistor and a second transistor connected in parallel between at least one of said high voltage side power supply and said low voltage side power supply and said resistor; said first transistor and second transistor in said transistor circuit constitute a current mirror circuit; the gate of said first transistor is connected to a connecting node between said first transistor and said resistor; said second transistor is connected to and disconnected from said first transistor by said control signal.

26. A device as claimed in claim 25, wherein a switching element is connected either between said second transistor and one of said high voltage side power supply and said low voltage side power supply to which said second transistor is connected, or between said second transistor and said connecting node, said control signal being applied to the control terminal of said switching element.

27. A device as claimed in claim 25, wherein a switching element is connected between said gate of said first transistor and said gate of said second transistor, and said control signal is applied to the control terminal of the switching element.

28. A device as claimed in claim 27, wherein said switching element is a transfer gate.

29. A device as claimed in claim 25, which further comprises a third transistor connected in parallel with said first and second transistors, and in which: the gate of said third transistor is connected to said connecting node; said control signal includes first and second control signals; parallel connection and disconnection of said second transistor to said first transistor are accomplished by said first control signal; and parallel connection and disconnection of said third transistor to said first transistor are accomplished by said second control signal.

* * * * *